US007391560B2

United States Patent
Natori et al.

(10) Patent No.: US 7,391,560 B2
(45) Date of Patent: Jun. 24, 2008

(54) MULTISTAGE OPTICAL AMPLIFIER HAVING TILT COMPENSATION FEATURE

(75) Inventors: Hidezumi Natori, Kawasaki (JP); Motoyoshi Sekiya, Kawasaki (JP); Takehiro Fujita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/945,272

(22) Filed: Sep. 21, 2004

(65) Prior Publication Data
US 2005/0219682 A1 Oct. 6, 2005

(30) Foreign Application Priority Data
Mar. 30, 2004 (JP) ............... 2004/098915

(51) Int. Cl.
*H01S 4/00* (2006.01)
*H04B 10/12* (2006.01)
(52) U.S. Cl. .................... 359/337.4; 359/334
(58) Field of Classification Search ............ 359/337.4, 359/334
See application file for complete search history.

(56) References Cited

U.S. PATENT DOCUMENTS

| 5,818,629 | A |  | 10/1998 | Kinoshita | 359/341 |
| 5,909,305 | A |  | 6/1999 | Kinoshita | 359/341 |
| 6,067,187 | A | * | 5/2000 | Onaka et al. | 359/337.11 |
| 6,160,659 | A |  | 12/2000 | Kinoshita | 359/337 |
| 6,327,076 | B1 | * | 12/2001 | Akiyama | 359/337.11 |
| 6,377,394 | B1 | * | 4/2002 | Drake et al. | 359/341.41 |
| 6,466,362 | B1 | * | 10/2002 | Friedrich | 359/334 |
| 6,646,790 | B2 | * | 11/2003 | Parry et al. | 359/337.11 |
| 6,731,874 | B2 | * | 5/2004 | Tsushima et al. | 398/45 |
| 2002/0171917 | A1 | * | 11/2002 | Lelic et al. | 359/341.4 |
| 2003/0161031 | A1 | * | 8/2003 | Benjamin et al. | 359/337.4 |
| 2003/0190166 | A1 | * | 10/2003 | Sekine | 398/97 |
| 2004/0075888 | A1 | * | 4/2004 | Eiselt | 359/337.13 |
| 2004/0240041 | A1 | * | 12/2004 | Tian et al. | 359/337 |

FOREIGN PATENT DOCUMENTS

| JP | 9-153865 | 6/1997 |
| JP | 9-159526 | 6/1997 |
| JP | 2000-91683 | 3/2000 |
| JP | 2000-307552 | 11/2000 |
| JP | 2003-51791 | 2/2003 |
| JP | 2003-264329 | 9/2003 |
| WO | WO 98/42088 | 9/1998 |

* cited by examiner

*Primary Examiner*—Jack W. Keith
*Assistant Examiner*—Eric Bolda
(74) *Attorney, Agent, or Firm*—Staas & Halsey LLP

(57) ABSTRACT

The present invention relates to an optical amplifier and, in particular, it relates to multistage optical amplification having a feature for compensating for the tilt that is generated when a signal having a plurality of optical wavelengths and the like according to a wavelength division multiplexing (WDM) method is amplified in a wide bandwidth. The multistage optical amplifier comprises: a plurality of optical amplifiers that are connected in a multistage manner; and a common control section for commonly controlling pumping light powers of said plurality of optical amplifiers, wherein said common control section includes: tilt detection means for detecting amounts of tilt of each of said plurality of optical amplifiers; and tilt cancellation means for controlling the pumping light powers of said plurality of optical amplifiers so that the amounts of tilt of each of the optical amplifiers detected by said tilt detection means cancel each other.

13 Claims, 18 Drawing Sheets

Fig.13
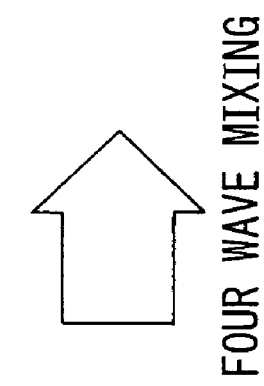
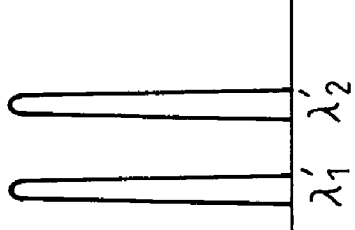

MULTISTAGE OPTICAL AMPLIFIER HAVING TILT COMPENSATION FEATURE

BACKGROUND OF THE INVENTION

1. Field of the Invention

The present invention relates to an optical amplifier and, in particular, it relates to a multistage optical amplifier that amplifies a signal having a plurality of optical wavelengths (hereinafter referred to as a "main signal" or a "channel"), and the like, in the wide bandwidth used in a WDM (wavelength Division Multiplexing) system.

2. Description of the Related Art

In recent years, as the Internet has rapidly become widespread, an optical wavelength division multiplexing transmission technique that enables large-capacity and long-distance transmission has attracted attention. In the optical amplification used for the long-distance WDM transmission system, an erbium doped fiber amplifier (EDFA), in which erbium is doped into optical fiber cores, is used. Further, as the number of wavelengths is increased due to the increase of speed and capacity of communications, a Raman fiber amplifier that has a wider amplification bandwidth than the EDFA is also used.

As the wavelength bandwidth to be used has expanded, a difference (tilt) of the level between the shortest wavelength channel and the longest wavelength channel of the WDM signal has tended to increase. The tilt is generated as a result of fiber loss wavelength characteristics of transmission paths, characteristics of the amplification factor of an optical amplifier, a nonlinear optical effect due to a stimulated Raman effect and the like and is accumulated due to the increase of transmission distances, the number of spans and the like.

In an optical transmission system, in order to maintain its transmission quality, it is necessary to ensure that the optical signal-to-noise ratio (OSNR) is higher than a predetermined value. However, as the OSNR of the channels, the level of which is reduced due to the tilt described above, is reduced significantly, the transmission distance, the number of transmission spans or the number of multiplexed wavelengths (or, in other words, the transmission bandwidth) will be restricted.

Therefore, conventionally, in order to compensate for the tilt that is generated and accumulated in the transmission path or the optical amplifier, every time an optical wavelength multiplexed signal is transmitted along several spans, the signal is once demultiplexed into separate channel signals by an optical demultiplexer (optical DEMUX), then, the power level of each channel signal is adjusted by an optical variable attenuator (optical ATT) so that the power level is equalized between the channels and, then, the channel signals are converted into a WDM signal again by an optical multiplexer (optical MUX).

In another conventional technique, in order to compensate for the tilt of a WDM signal collectively in a one-stage optical amplifier, the tilt generated in the amplifier is detected by using predetermined false signals and, then, based on the detected value of the tilt, a gain is controlled by adjusting pumping light power and an amount of attenuation is controlled by an optical variable attenuator in a combined manner so that the optical amplifier achieves a flat gain (see Documents 1 and 2).

Document 1:
Japanese Unexamined Patent Publication 2003-51791
Document 2:
Japanese Unexamined Patent Publication 2000-91683

However, in the device configuration using optical demultiplexers and optical multiplexers every several spans for level adjustment of separate channels as in the conventional example, there is a problem in that the size and cost of the device is increased. In this case, as optical amplifiers are typically required to compensate for insertion losses generated when the channel signals pass through the optical demultiplexers and optical multiplexers, there is also a problem in that amplified spontaneous emission light (ASE light) is generated in these optical amplifiers and superimposed on the main signal to degrade the OSNR and, thus, the transmission quality is degraded.

Further, when the pumping light power is controlled based on the detected value of the tilt in the one-stage optical amplifier, there is a problem in that flat gain characteristics can be achieved at a particular amplification gain value corresponding to a specific pumping light power and the maximum gain of the optical amplifier is limited, in a pinpoint manner, to such a particular amplification gain value.

In this case, as a reference operating point is set to a level lower than said maximum gain, by some dB, in consideration of fluctuations of the input signal level, the gain of the optical amplification is further restricted. As a result, when this optical amplifier is used as a first-stage amplifier in a multistage configuration, there is a problem in that the OSNR is not improved much and, therefore, good transmission quality cannot be provided.

SUMMARY OF THE INVENTION

In view of the above problems, it is an object of the present invention to provide a multistage optical amplifier having a tilt compensation feature that can compensate for tilt of a main signal generated in the optical amplifier collectively and automatically and ensure a remarkably improved OSNR and good transmission quality in an appropriate device size and at a reasonable cost.

According to the present invention, there is provided a multistage optical amplifier comprising: a plurality of optical amplifiers that are connected in a multistage manner; and a common control section for commonly controlling pumping light powers of said plurality of optical amplifiers, wherein said common control section includes: tilt detection means for detecting amounts of tilt of each of said plurality of optical amplifiers; and tilt cancellation means for controlling the pumping light powers of said plurality of optical amplifiers so that the amounts of tilt of each of the optical amplifiers detected by said tilt detection means cancel each other.

Said tilt detection means detects the amounts of tilt of each of said optical amplifiers from the difference of the level between probe lights disposed at both ends of a main signal, and said tilt cancellation means achieves flat gain-wavelength characteristics by canceling the amounts of tilt of each of said optical amplifiers.

Further, said tilt detection means includes: common light detection means for commonly detecting probe lights from said plurality of optical amplifiers; and switch means for sequentially switching the probe lights from said plurality of optical amplifiers and supplying the probe lights to said common light detection means.

Said multistage amplifier is constituted by a two-stage optical amplifier in which each of a former stage and a latter stage consists of an erbium doped fiber or a two-stage optical amplifier in which a former stage consists of an optical amplifier having an erbium doped fiber and a latter stage consists of an optical amplifier having a Raman fiber.

Further, according to the present invention, there is provided a method for controlling the tilt of a multistage optical amplifier in which two stages of optical amplifiers are interconnected, comprising the steps of: activating a former-stage optical amplifier and a latter-stage optical amplifier by respective pumping light powers; controlling the pumping light power of the former-stage optical amplifier so that the optical output of the former-stage optical amplifier reaches a desired level; detecting amounts of tilt of each of the former-stage optical amplifier and the latter-stage optical amplifier; and controlling the pumping light power of the latter-stage optical amplifier so that the amount of tilt of the former-stage optical amplifier is canceled by the amount of tilt of the latter-stage optical amplifier and, as a result, the combined amount of tilt, of the former-stage optical amplifier and the latter-stage optical amplifier, falls within a desired range.

According to the present invention, degradation of transmission quality due to accumulated tilt can be inhibited collectively without using expensive modules such as optical demultiplexers and optical multiplexers and, therefore, the transmission quality in a wideband WDM transmission system can be improved in an appropriate device size and at a reasonable cost.

Further, according to the present invention, the tilt cancellation control and gain control of the former-stage amplifier and the latter-stage amplifier is performed by the common control section. Therefore, by combining said tilt cancellation control with flexibility in gain allocation between the former-stage amplifier and the latter-stage amplifier, the gain restriction of the former-stage amplifier in the conventional example can be eliminated and, further, a larger gain can be allocated to the former stage on the assumption that the tilt occurs so that an OSNR and transmission quality can be improved significantly.

Still further, according to the present invention, as said common control section can control a gain of one or both of the amplifiers while monitoring the condition of the tilt cancellation, the conventional optical variable attenuator may be eliminated.

BRIEF DESCRIPTION OF THE DRAWINGS

The present invention will be more clearly understood from the description as set forth below with reference to the accompanying drawings:

FIG. 13 is a diagram showing an example of a four-wave mixed light;

DESCRIPTION OF THE PREFERRED EMBODIMENTS

Figure 1:
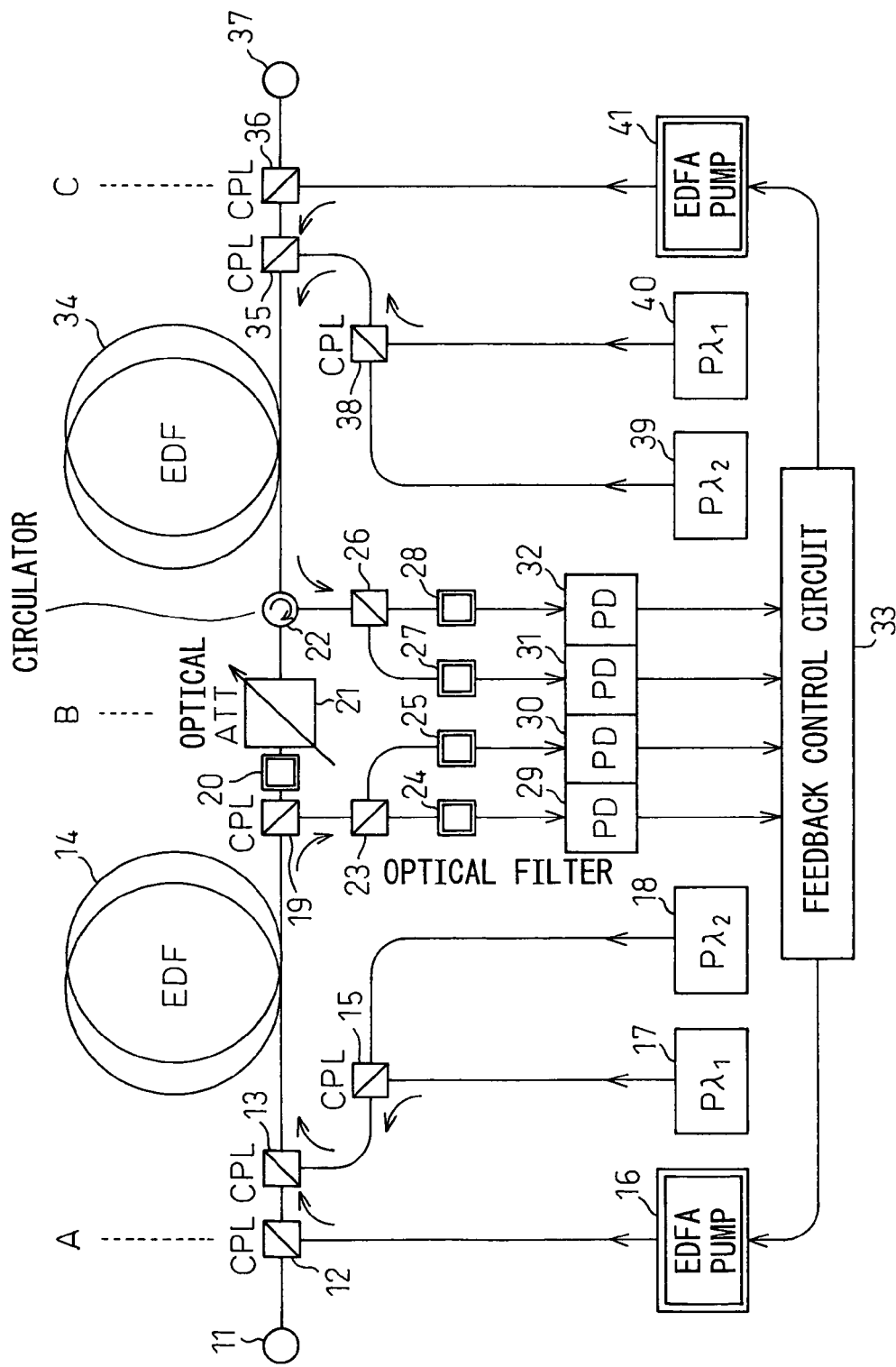
FIG. 1 is a diagram showing a first embodiment of the present invention.

FIG. 1 shows a first embodiment of a multistage optical amplifier having a tilt compensation feature according to the present invention. Though a two-stage optical amplifier is exemplified in this example, the present invention is not limited to such a configuration.

In FIG. 1, a main signal is input from an input port 11 and, in an optical coupler (CPL) 12, coupled with a pumping light from an EDFA pumping section (EDFA Pump) 16 for the former stage. The signal is further coupled with two probe lights $P\lambda_1$ and $P\lambda_2$ from probe light sources 17 and 18, respectively, for the former stage via optical couplers (CPL) 15 and 13 and, then, input to an erbium doped fiber (EDF) 14 for the former stage.

The EDF 14 amplifies the input main signal and probe lights by the pumping light and a portion of the amplified signal is separated by an optical coupler (CPL) 19. The portion of the signal separated by the optical coupler 19 is further divided into two waves in a subsequent optical coupler (CPL) 23 and input into respective optical filters 24 and 25.

The optical filter 24 passes only the probe light $P\lambda_1$ and the optical filter 25 passes only the probe light $P\lambda_2$. Signal levels of the probe lights $P\lambda_1$, and $P\lambda_2$ are detected by subsequent photodiodes 29 and 30, respectively.

On the other hand, only the main signal portion of the main signal and the probe lights that have passed through the optical coupler 19 is now passed through a subsequent optical filter 20 and input to an optical variable attenuator (ATT) 21. The optical variable attenuator 21 changes the amount of attenuation of the input main signal according to the directions of a feedback control section 33 so that the output level of the main signal eventually output from the output port 37 can be kept constant.

The main signal, which is attenuated by the optical variable attenuator 21, is passed through the circulator 22 without change and input to an erbium doped fiber (EDF) 34 in the latter stage. Also in the latter stage, the main signal input to the EDF 34 is amplified by using a pumping light from an EDFA pumping section (EDFA Pump) 41 for the latter stage. The latter stage is configured similarly to the former stage except that the pumping light and probe lights are traveling in the inverse direction to that in the former stage.

The pumping light from the EDFA pumping section 41 for the latter stage is coupled to a main signal path via an optical coupler (CPL) 36 and the two probe lights $P\lambda_1$ and $P\lambda_2$ from probe light sources 39 and 40, respectively, for the latter stage are coupled to the same main signal path via optical couplers 38 and 35.

The pumping light and the two probe lights $P\lambda_1$ and $P\lambda_2$ input in the latter stage are isolated from the former stage by a circulator 22 and flow into an optical coupler (CPL) 26. The optical coupler 26 divides them into two waves and inputs the two waves to respective optical filters 27 and 28. The optical filter 27 passes only the probe light $P\lambda_1$ and the optical filter 28 passes only the probe light $P\lambda_2$. Signal levels of the probe lights $P\lambda_1$ and $P\lambda_2$ are detected by subsequent photodiodes 31 and 32, respectively.

The feedback control section 33, which is shared by the former and latter stages, compares the signal level between the probe lights $P\lambda_1$ and $P\lambda_2$ from the photodiode 29 and 30, respectively, for the former stage to detect the amount of tilt of the former-stage optical amplifier. Similarly, the feedback control section 33 compares the signal level between the probe lights $P\lambda_1$ and $P\lambda_2$ from the photodiode 31 and 32, respectively, for the latter stage to detect the amount of tilt of the latter-stage optical amplifier.

Based on these detection results, the feedback control section 33 controls the respective pumping light powers of the EDFA pumping section 16 for the former stage and the EDFA pumping section 41 for the latter stage so that the amounts of tilt of the former-stage and latter-stage optical amplifiers cancel each other.

Therefore, according to this embodiment, each optical amplifier in the former and latter stages does not need to have flat gain characteristics and it is not necessary that the maximum gain of the optical amplification is limited, in a pinpoint manner, to a particular amplification gain value at which the flat gain characteristics are exhibited by a specific pumping light power, as in the conventional art. As a result, an OSNR and transmission quality can be improved significantly by allocating a larger portion of the gain to the former-stage amplifier while allowing the occurrence of tilt to some extent. This also contributes to the increase of the transmission distance and the number of spans.

Figure 2:
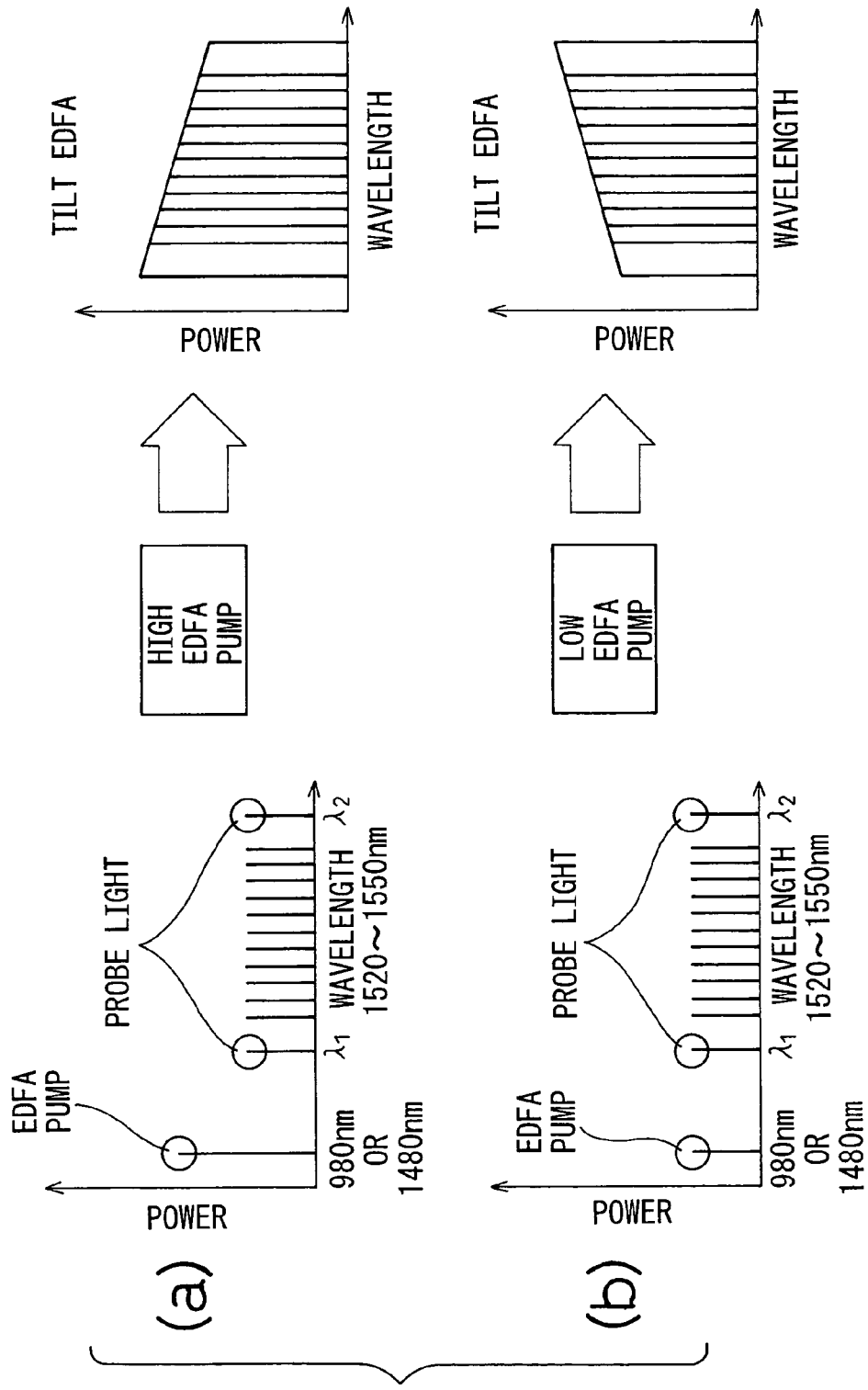
FIG. 2 is a diagram showing a relationship (1) between a pumping light power and gain characteristics in an EDFA.
Figure 3:
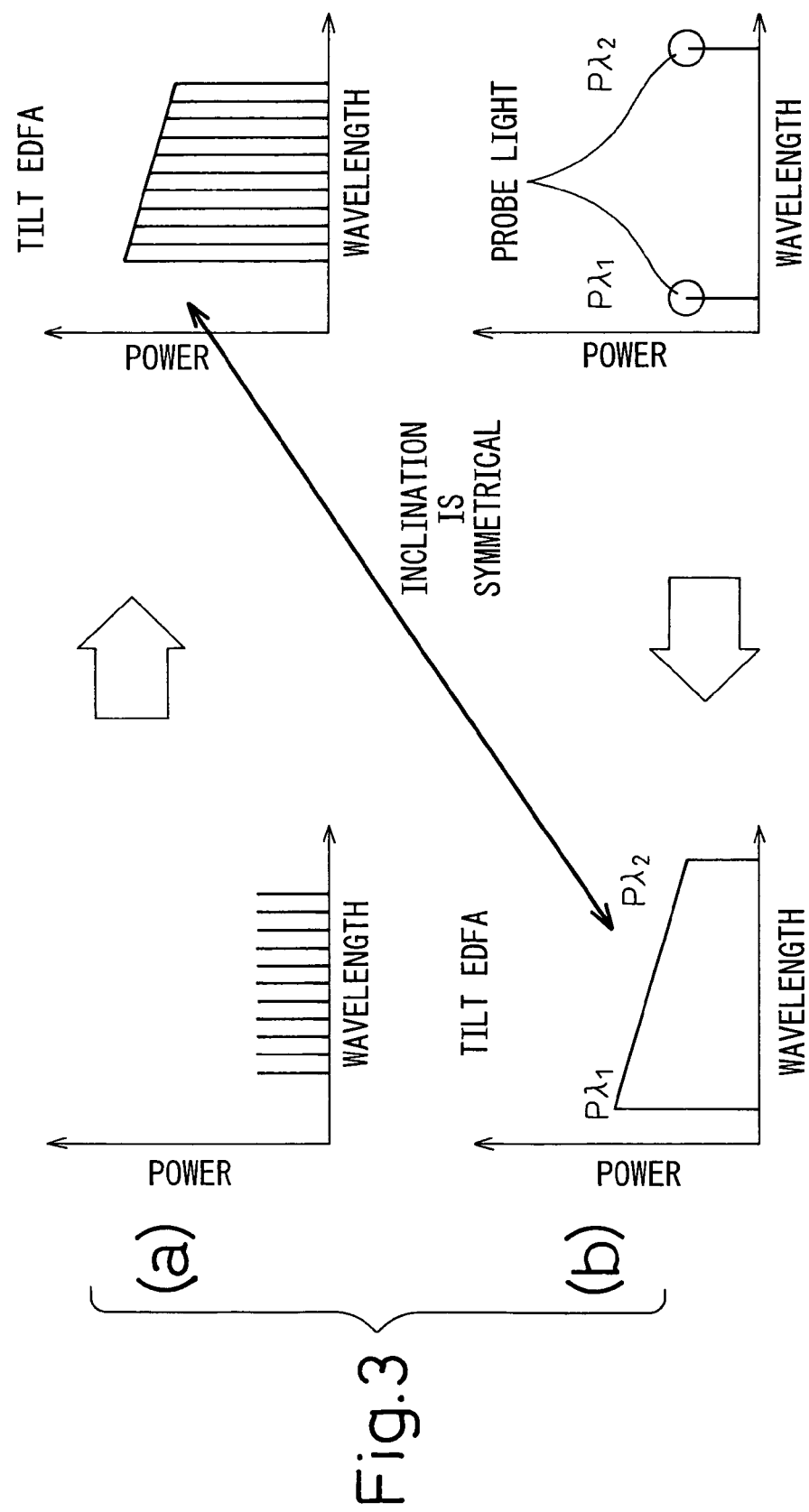
FIG. 3 is a diagram showing a relationship (2) between a pumping light power and gain characteristics in an EDFA.

FIGS. 2 and 3 show relationships between a pumping light power and EDFA gain characteristics.

Item (a) in FIG. 2 shows an example in which the probe lights $P\lambda_1$ and $P\lambda_2$ for the former stage are disposed at both ends of an input C band (1520-1550 nm) main signal and, along with them, a pumping light (980 nm or 1480 nm) having a larger power than a pumping light power (standard value) that exhibits flat gain characteristics is input to the former-stage EDF 14. As the pumping light power exceeds the standard value as in this example, the EDF 14 exhibits steadily declining tilt characteristics wherein the gain is reduced in the higher band than in the lower band.

On the other hand, Item (b) in FIG. 2 shows an example in which said main signal and probe lights are amplified by inputting a pumping light having a smaller power than the standard value to the EDF 14. As the pumping light power is reduced as in this example, the EDF 14 exhibits steadily increasing tilt characteristics wherein the gain is increased in the higher band than in the lower band.

Further, Item (a) in FIG. 3 shows an example in which the main signal from the former stage is input to the EDF 34 in the latter stage and Item (b) in FIG. 3 shows an example in which the probe lights $P\lambda_1$ and $P\lambda_2$ for the latter stage that are disposed at both ends of the main signal and a pumping light for the latter stage that has a larger power than the standard value are input to the EDF 34 in the latter stage from the opposite direction to the propagating direction of the main signal.

It can be seen from the above examples that the tilt characteristics given to the main signal shown in Item (a) of FIG. 3 agree with the tilt characteristics of the probe lights $P\lambda_1$ and $P\lambda_2$ in Item (b) of FIG. 3 that are input from the opposite direction to the former. Therefore, the tilt characteristics of the latter-stage optical amplifier can be detected from the difference of the level between the probe lights $P\lambda_1$ and $P\lambda_2$ for the latter stage.

Figure 4:
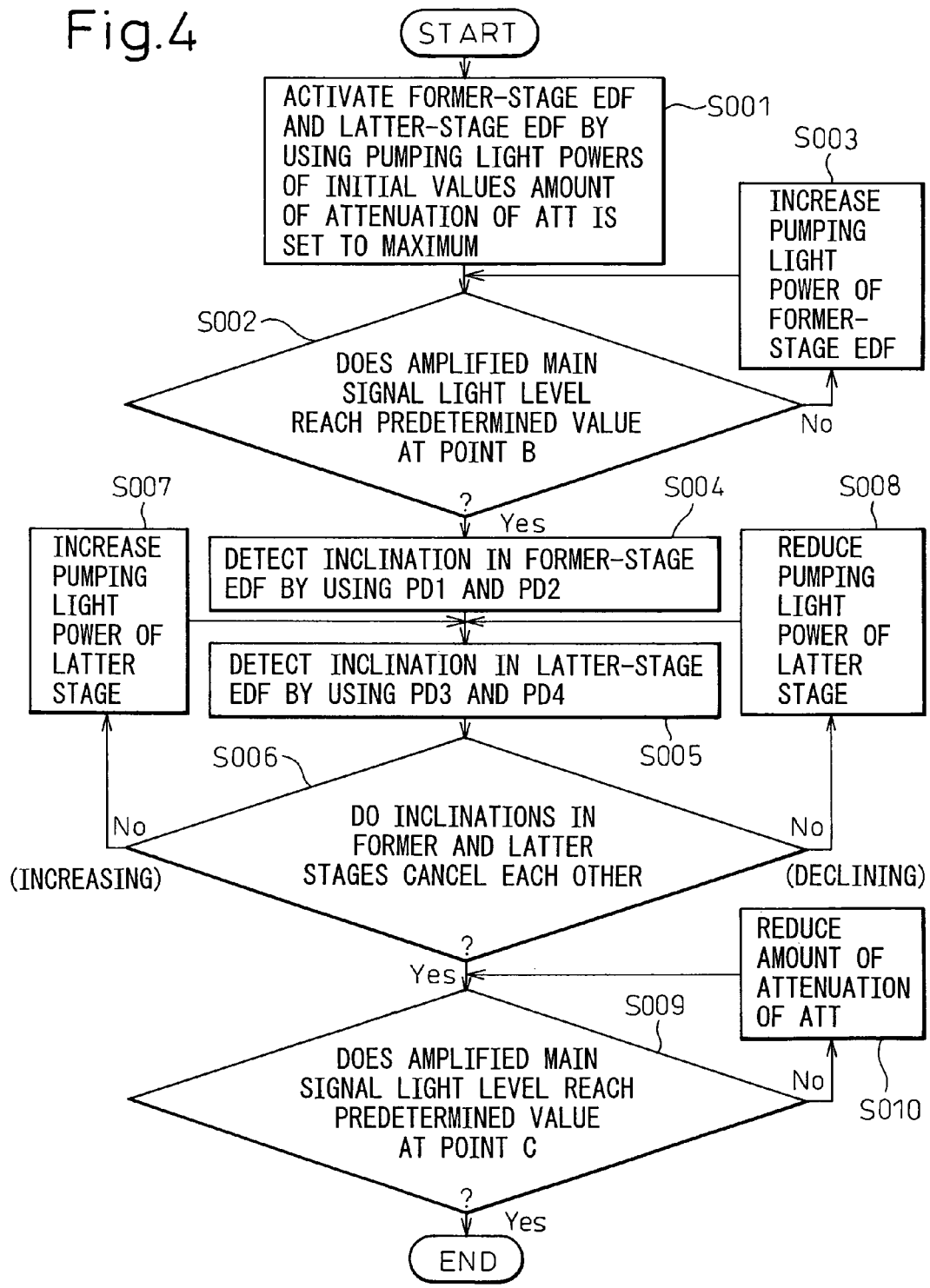
FIG. 4 is a diagram showing an exemplary control flow of tilt compensation in FIG. 1.

FIG. 4 shows an exemplary control flow of tilt compensation in the first embodiment.

In FIG. 4, the feedback control section 33 activates the former-stage EDF 14 and the latter-stage EDF 34 by using the pumping light powers of respective initial values. At this time, the amount of attenuation of the optical variable attenuator 21 is set to a maximum value (S001).

Next, at point B (FIG. 1) where the amplified main signal is output from the former stage EDF 14, it is determined whether the level of the main signal reaches a predetermined value that is expected in relation to said initial value (S002). If it does not reach said predetermined value, the EDFA pumping section 16 for the former stage is controlled to increase the pumping light power till the level of the main signal reaches said predetermined value without consideration of the occurrence of the tilt in the former-stage EDF 14 (S003).

If the level of the main signal reaches said predetermined value, the inclination of the level of the main signal (the amount of tilt) in the former-stage EDF 14 is detected from the difference of the level between the probe lights $P\lambda_1$ and $P\lambda_2$ for the former stage (S004) and, at the same time, the inclination of the level of the main signal (the amount of tilt) in the latter-stage EDF 34 at this time is detected from the difference of the level between the probe lights $P\lambda_1$ and $P\lambda_2$ for the latter stage (S005).

Next, it is determined whether the inclinations in the former-stage EDF 14 and the latter-stage EDF 34 cancel each other to achieve a flat gain or not (S006). Based on the result of this determination, if the inclination obtained by combining the two inclinations is steadily increasing (Item (a) in FIG. 2), the EDFA pumping section 41 for the latter stage is controlled to increase the pumping light power until the increasing inclination of the tilt characteristics is eliminated and a flat gain is achieved (S007).

On the contrary, if the inclination obtained by combining the two inclinations is steadily declining (Item (b) in FIG. 2), the EDFA pumping section 41 for the latter stage is controlled to reduce the pumping light power till the declining inclination of the tilt characteristics is eliminated and a flat gain is achieved (S008).

After the flat gain is achieved, at point C (FIG. 1) where the main signal is output from the latter-stage EDF 34, in order to keep the optical output of the main signal constant, it is determined whether the level of the main signal reaches a predetermined value or not (S009). If it does not reach said predetermined value, the optical variable attenuator 21 is controlled to reduce the amount of attenuation till the level of the main signal reaches said predetermined value (S010) so that the output level of the main signal is kept constant.

Figure 5:
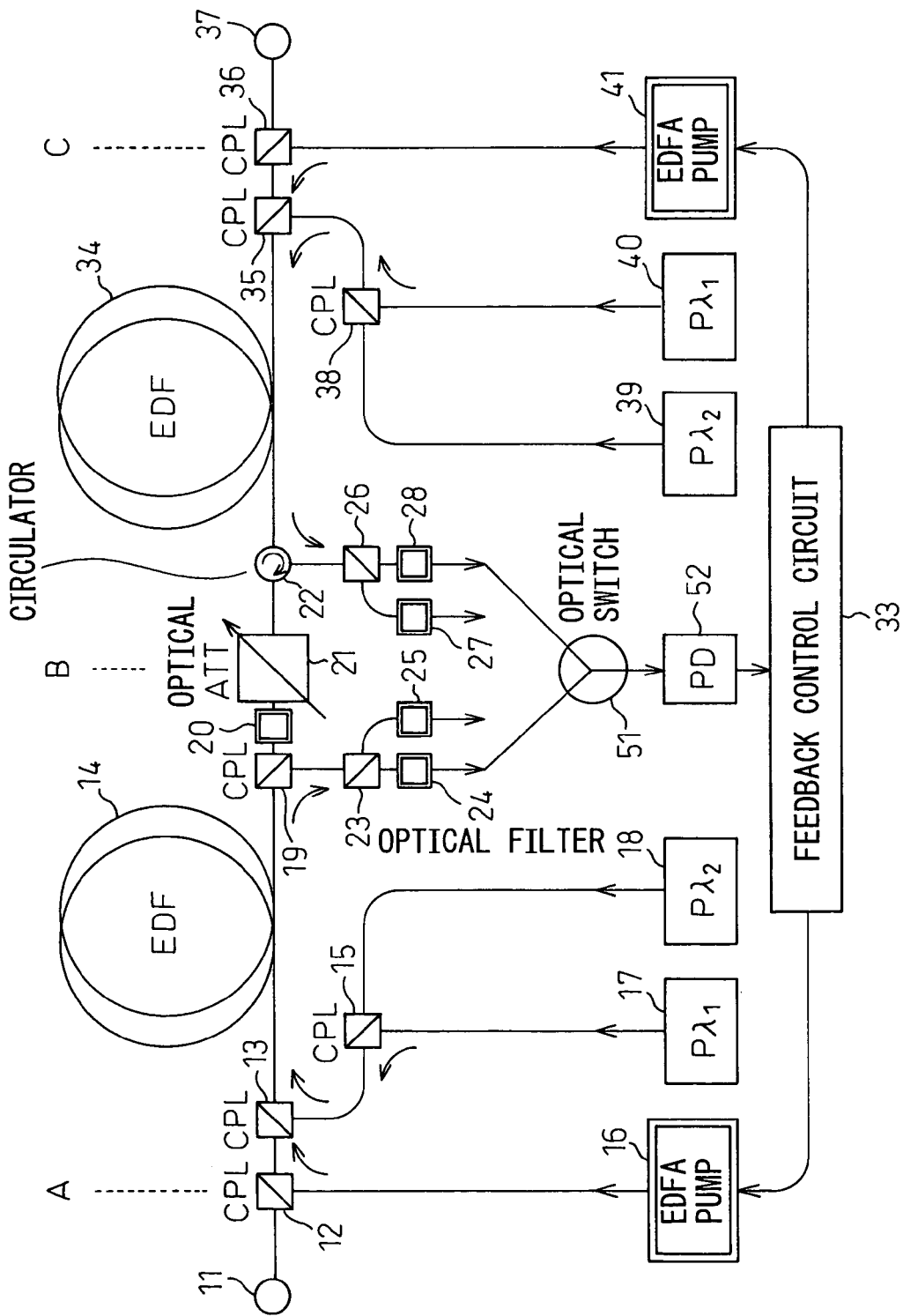
FIG. 5 is a diagram showing another exemplary aspect of FIG. 1.

FIG. 5 shows another exemplary aspect of the first embodiment shown in FIG. 1.

In FIG. 1, the probe lights $P\lambda_1$ and $P\lambda_2$ from the former stage and the probe lights $P\lambda_1$ and $P\lambda_2$ from the latter stage are detected individually by using the four photodiodes 29-32. In contrast to this, the multistage optical amplifier in this example uses one optical switch 51 and one photodiode 52 so that the common photodiode 52 can detect each probe light $P\lambda_1$ and $P\lambda_2$ by sequentially switching the optical switch 51. The rest of the configuration is similar to that in FIG. 1.

According to this configuration, the components shared by the former and latter stages can be configured simply and, further, it is not necessary to consider the unevenness of light receiving characteristics among the photodiodes 29-32 in FIG. 1. Therefore, it is also not necessary to adjust the light receiving level among the light detection circuits using the photodiodes 29-32. As a result, the feedback control section 33 that is shared by the former and latter stages can compare the respective probe lights P$\lambda_1$ and P$\lambda_2$ accurately without adjustment.

Figure 6:
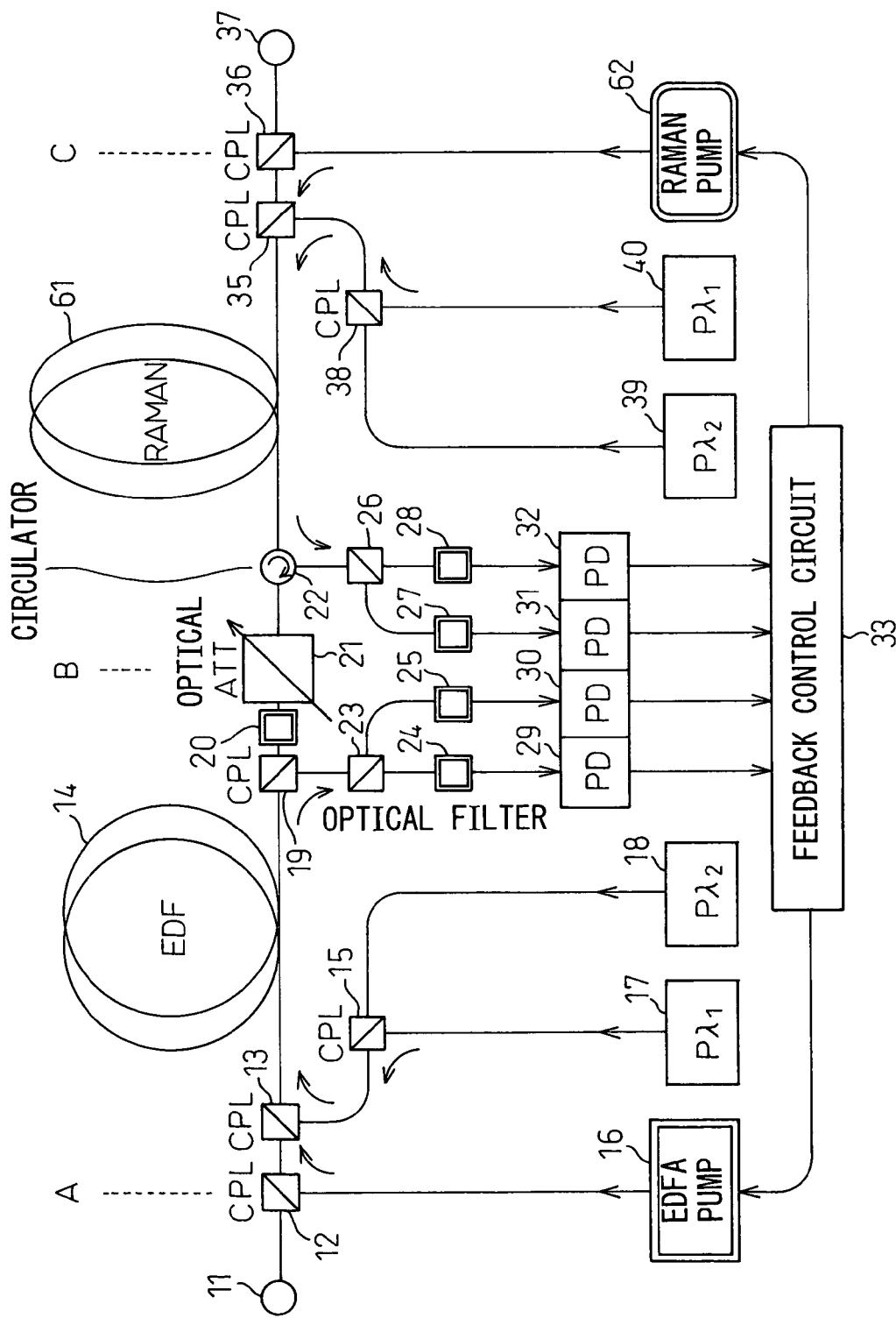
FIG. 6 is a diagram showing a second embodiment of the present invention.

FIG. 6 shows a second embodiment of a multistage optical amplifier having a tilt compensation feature according to the present invention. Though a two-stage optical amplifier is exemplified also here, the present invention is not limited to such configuration.

In FIG. 6, a Raman fiber amplifier (RAMAN) 61 is adopted as an optical amplifier in the latter stage and, therefore, a Raman fiber pumping section (RAMAN Pump) 62 is provided. Other configuration is similar to that in FIG. 1.

In general, the EDFA can achieve flat gain characteristics only in a relatively narrow bandwidth and the range of the available pumping light power in such bandwidth is restricted. On the other hand, in the Raman fiber amplifier that amplifies signals via stimulated Raman scattering in optical fibers, gain bandwidth is not restricted unlike in the EDFA and, further, arbitrary gain characteristics can be achieved to some extent by using a plurality of pumping light powers. However, in the Raman fiber amplifier, the efficiency of utilization of the pumping light power is reduced and, therefore, its output power is restricted.

Figure 7:
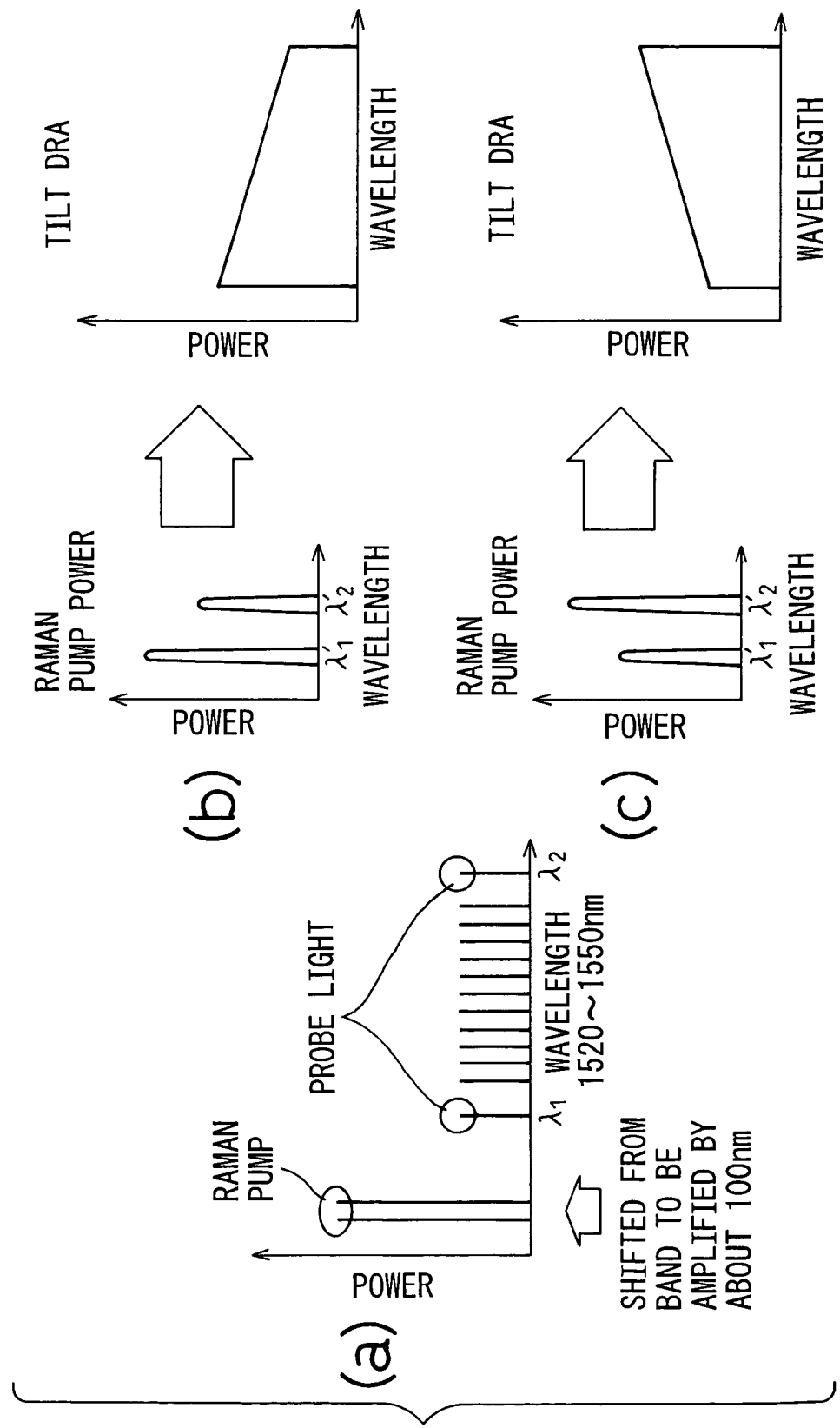
FIG. 7 is a diagram showing a relationship between a pumping light power and gain characteristics in a Raman fiber.

FIG. 7 shows an example of a pumping light power and gain bandwidth characteristics in a Raman fiber.

Item (a) in FIG. 7 shows an example in which the probe lights P$\lambda_1$ and P$\lambda_2$ for the latter stage are disposed at both ends of the main signal from the former stage and, further, two pumping lights $\lambda_1'$ and $\lambda_2'$ that are shifted from the main signal band to be amplified by about 100 nm are disposed. In this case, $\lambda_1'$ is 1420 nm and $\lambda_2'$ is 1450 nm. In this connection, it is to be noted that there is no limit on the number of Raman pumping lights, in general.

Item (b) in FIG. 7 shows an example in which the power of the pumping light $\lambda_1'$ of the two pumping lights $\lambda_1'$ and $\lambda_2'$ is larger than that of the pumping light $\lambda_2'$. In this case, the main signal in a specific bandwidth corresponding to the pumping light $\lambda_1'$ and the main signal in a specific bandwidth corresponding to the pumping light $\lambda_2'$ are amplified in a staggered manner according to the powers of the pumping lights $\lambda_1'$ and $\lambda_2'$. As a result, the main signal exhibits steadily declining tilt characteristics.

On the other hand, Item (c) in FIG. 7 shows an example in which the power of the pumping light $\lambda_1'$ of the two pumping lights $\lambda_1'$ and $\lambda_2'$ is smaller than that of the pumping light $\lambda_2'$. In this case, contrary to Item (b) in FIG. 7, the main signal is amplified to exhibit steadily increasing tilt characteristics.

Thus, though the efficiency of utilization of the pumping light power is reduced, the Raman fiber amplifier has an advantage in that the gain characteristics and the bandwidth of the main signal can be controlled independently of each other by combining a plurality of pumping lights and selecting the power of these pumping lights appropriately. The multistage optical amplifier according to the second embodiment of the present invention is configured so that the advantages of the former-stage EDF 14 and the latter stage Raman fiber 61 can be utilized actively and the both can compensate for each other's disadvantages.

More specifically, in the EDF 14 in the former stage having higher pumping efficiency, in order to improve the OSNR, a higher gain is allocated on the assumption that the tilt occurs. Then, in the Raman fiber 61 in the latter stage, the consumption of its pumping power is restrained by compensating for the tilt that is generated mainly in the former stage. Further, as described below, the Raman fiber 61 in the latter stage can keep the output constant in place of the optical variable attenuator 21 (see FIG. 9). By controlling these components through the common feedback control 33, it is possible to provide a high-efficiency optical amplifier having an improved OSNR and flat gain characteristics in an appropriate device size and at a reasonable cost.

Figure 8:
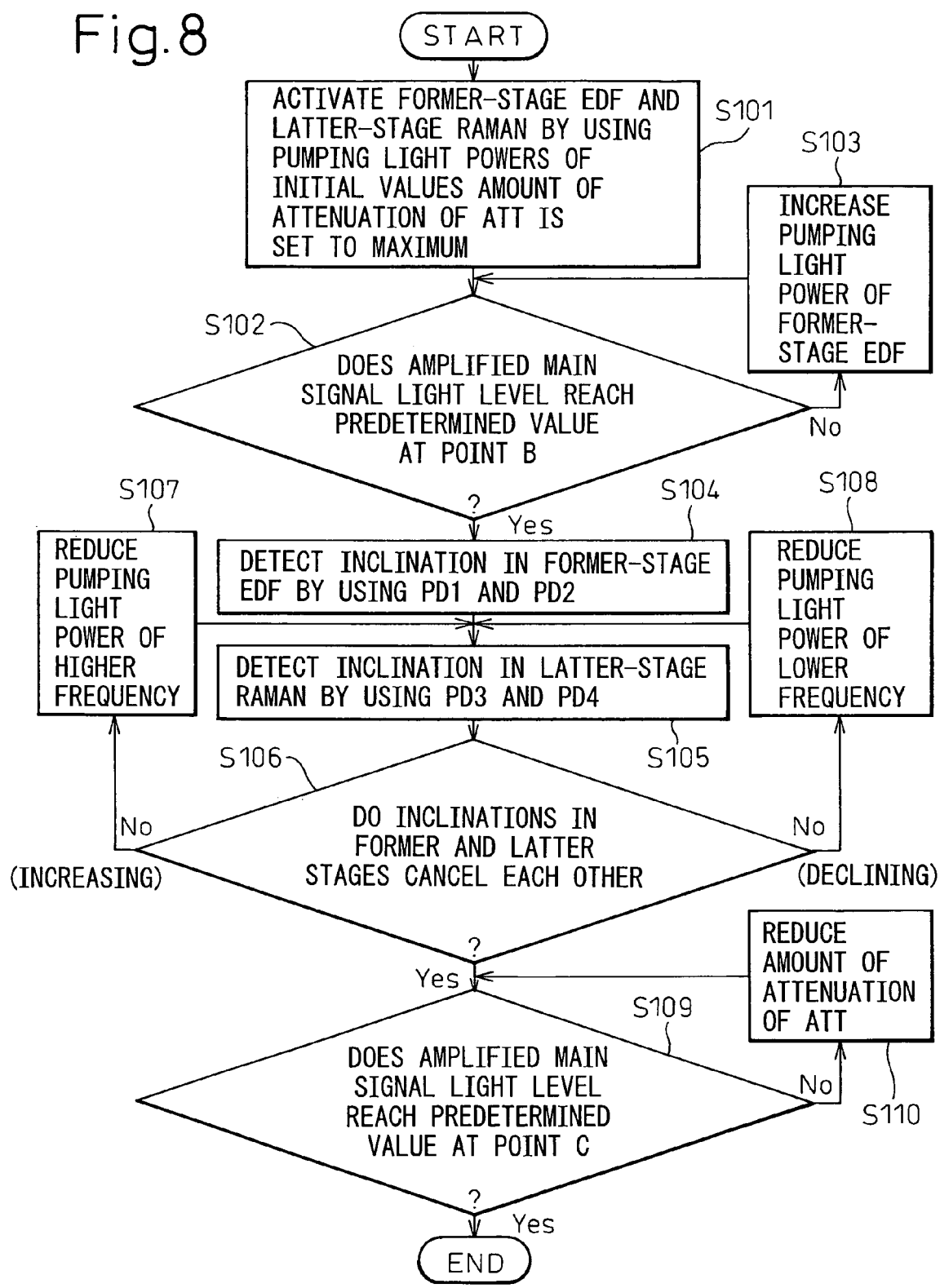
FIG. 8 is a diagram showing an exemplary control flow of tilt compensation in FIG. 6.

FIG. 8 shows an exemplary control flow of tilt compensation in the second embodiment.

FIG. 8 is basically identical to the control flow of tilt compensation in the first embodiment shown in FIG. 4. Here, only the distinction between them will be described.

First, in Step S105 of FIG. 8, the inclination of the level of the main signal (the amount of tilt) in the latter-stage Raman fiber 61 at this time is detected from the difference of the level between the probe lights P$\lambda_1$ and P$\lambda_2$ for the latter stage. Next, it is determined whether the inclinations in the former-stage EDF 14 and the latter-stage Raman fiber 61 cancel each other to achieve a flat gain or not (S106).

Based on the result of this determination, if the inclination obtained by combining the two inclinations is steadily increasing (Item (b) in FIG. 7), the Raman fiber pumping section 62 for the latter stage is controlled to reduce the power of the pumping light $\lambda_2'$ having a higher frequency till such tilt characteristics are compensated and a flat gain is achieved (S107).

On the contrary, if the inclination obtained by combining the two inclinations is steadily declining (Item (c) in FIG. 7), the Raman fiber pumping section 62 for the latter stage is controlled to reduce the power of the pumping light $\lambda_1'$ having a lower frequency till such tilt characteristics are compensated for and a flat gain is achieved (S108). The steps other than those mentioned above are identical to those in FIG. 4.

Figure 9:
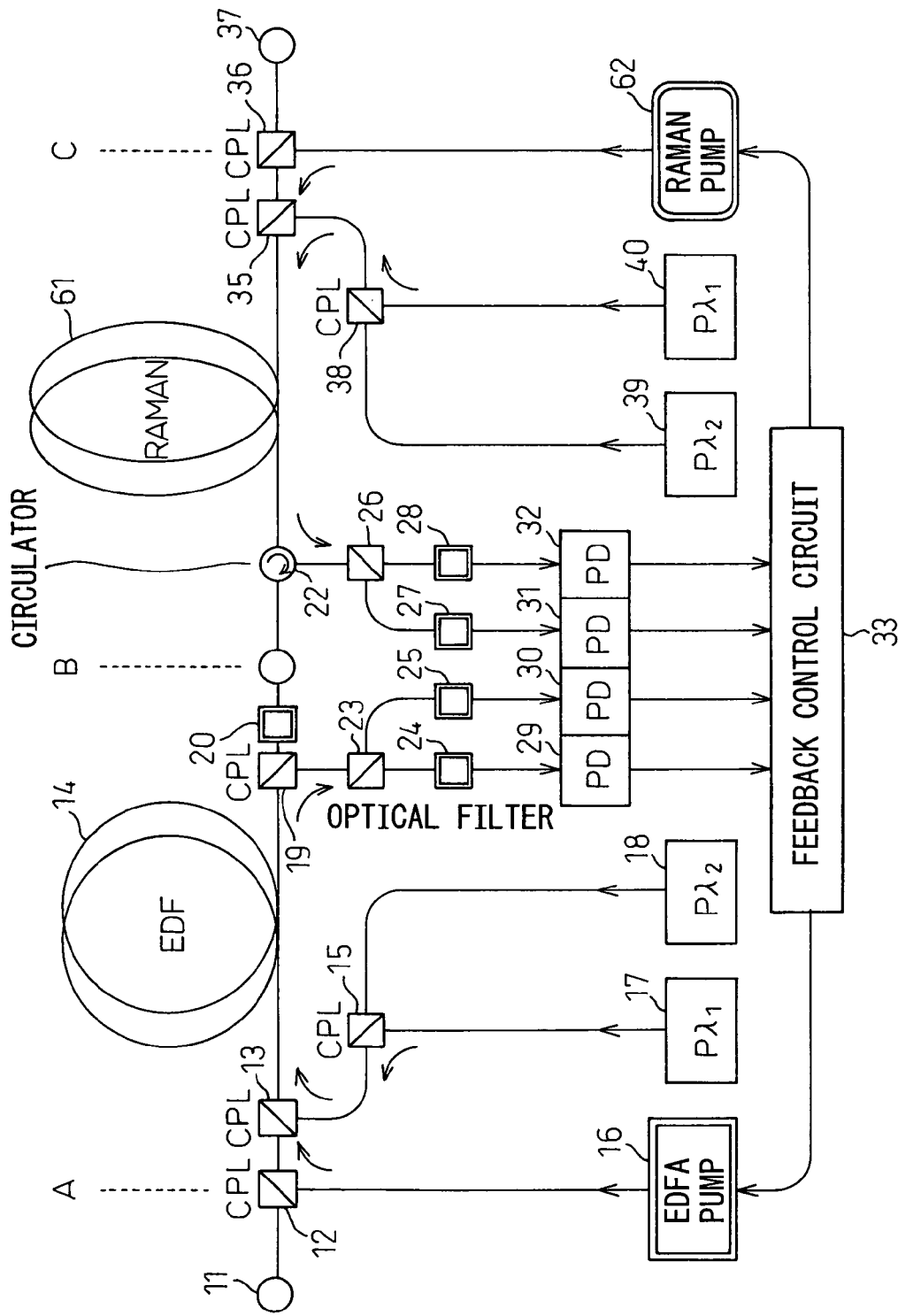
FIG. 9 is a diagram showing another exemplary aspect (1) of FIG. 6.

FIG. 9 shows another exemplary aspect of the second embodiment shown in FIG. 6.

The multistage optical amplifier in FIG. 9 is configured similarly to that in FIG. 6 except that the optical variable attenuator (ATT) 21 in FIG. 6 is omitted. In this example, the Raman fiber 61 and the Raman fiber pumping section 62, which are controlled by the feedback control section 33, act in place of the optical variable attenuator (ATT) 21.

Figure 10:
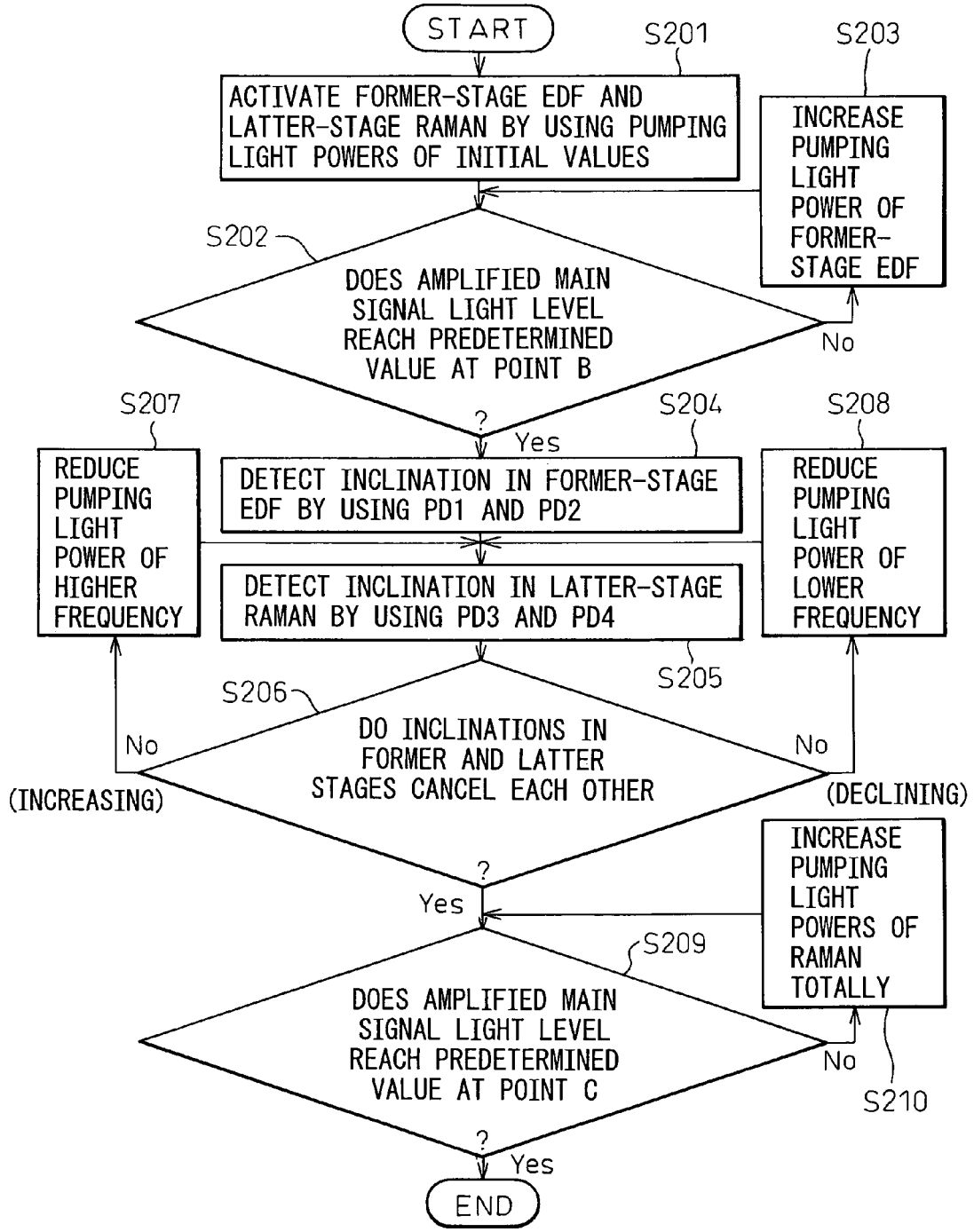
FIG. 10 is a diagram showing an exemplary control flow of tilt compensation in FIG. 9.

FIG. 10 shows an exemplary control flow of tilt compensation in FIG. 9.

FIG. 10 is also basically identical to the control flow of tilt compensation in the second embodiment shown in FIG. 8 and, therefore, only the distinction between them will be described here.

First, in step S201, only the former-stage EDF 14 and the latter-stage Raman fiber 61 are activated by using the pumping light powers of respective initial values but the activation of the optical variable attenuator 21 is naturally not included in this example. Then, this example is characterized by step S210 in which, after a flat gain is achieved, the Raman fiber amplifier controls the optical output of the main signal to be constant at point C (FIG. 6) where the main signal is output from the Raman fiber 61 in the latter stage.

More specifically, if the output level of the main signal does not reach a predetermined value (S209), the feedback control section 33 controls the Raman fiber pumping section 62 to increase the total power of the pumping lights $\lambda_1'$ and $\lambda_2'$ (S210) while maintaining the power ratio between the pumping lights $\lambda_1'$ and $\lambda_2'$ when the flat gain is achieved (S206). In this example, the output level of the main signal can be kept constant without using the optical variable attenuator 21.

Figure 11:
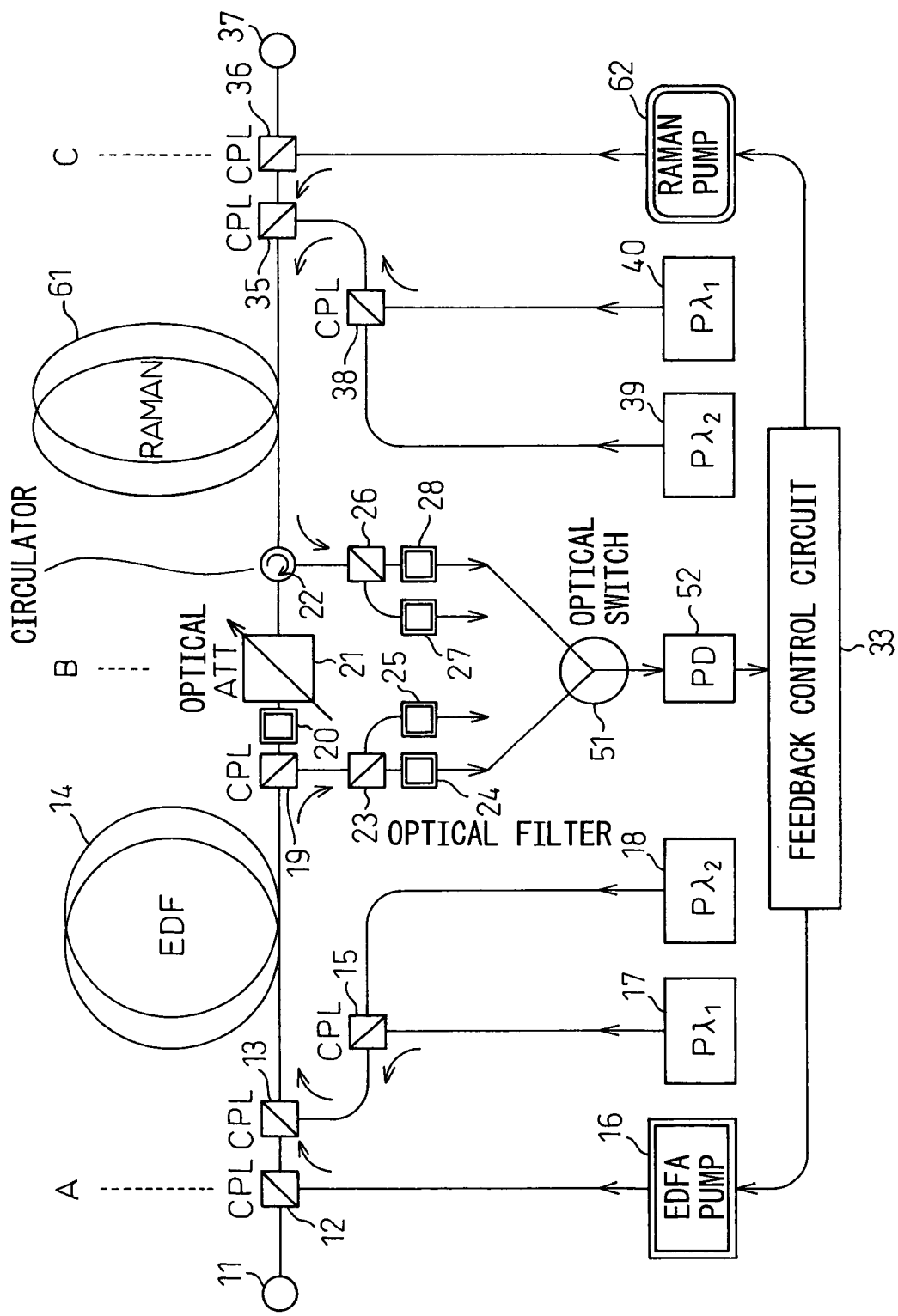
FIG. 11 is a diagram showing another exemplary aspect (2) of FIG. 6.

FIG. 11 shows yet another exemplary aspect of the second embodiment shown in FIG. 6.

In a similar manner to that in FIG. 5 described above, the multistage optical amplifier in this example uses one optical switch 51 and one photodiode 52 so that the common photodiode 52 can detect each probe light $P\lambda_1$ and $P\lambda_2$ by sequentially switching the optical switch 51. The rest of the configuration is similar to that in FIG. 6.

According to this configuration, as described above with reference to FIG. 5, the common control section in FIG. 6 can be configured simply and the feedback control section 33 can compare the respective probe lights $P\lambda_1$ and $P\lambda_2$ accurately without adjustment.

Figure 12:
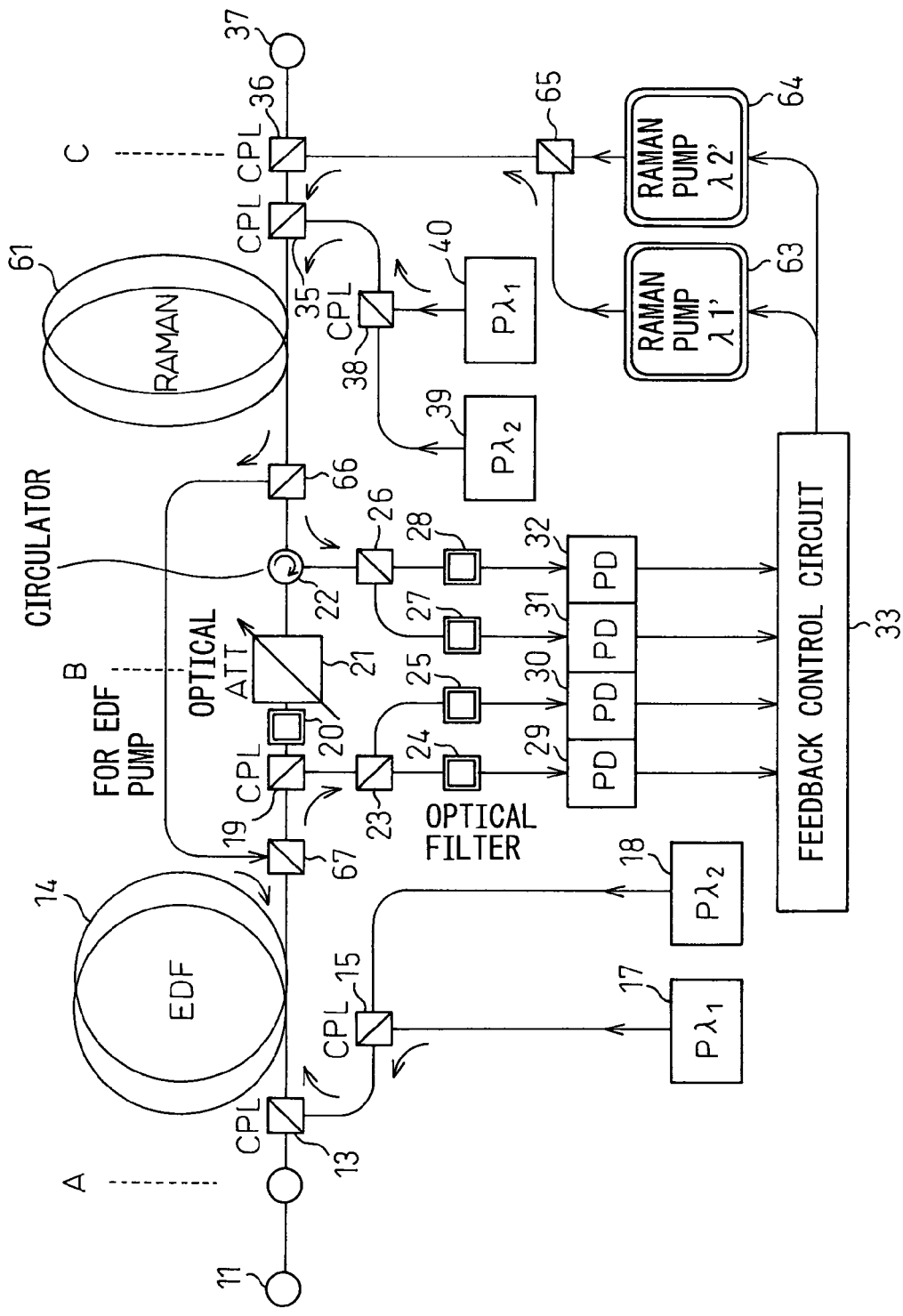
FIG. 12 is a diagram showing a third embodiment of the present invention.

FIG. 12 shows a third embodiment of a multistage optical amplifier having a tilt compensation feature according to the present invention. Though a two-stage optical amplifier is exemplified also in this example, the present invention is not limited to such configuration.

In FIG. 12, the multistage optical amplifier is provided with two latter-stage Raman fiber pumping sections 63 and 64 that can be controlled independently by the feedback control section 33 and utilizes a well-known four-wave mixed light generated by pumping lights $\lambda_1'$ and $\lambda_2'$ from the Raman fiber pumping sections 63 and 64 so that the pumping light for the former-stage EDF 14 can also be generated. This eliminates the need for the former-stage EDFA pumping section 16 and the optical coupler 12 for coupling the pumping light from the EDFA pumping section 16 to the transmission path of the main signal and, therefore, these elements are omitted in FIG. 12. On the other hand, an optical coupler 65 is provided for multiplexing the pumping lights $\lambda_1'$ and $\lambda_2'$ from the Raman fiber pumping sections 63 and 64, respectively, and supplying the multiplexed light to the latter-stage Raman fiber 61 and, further, optical couplers 66 and 67 are provided for forming an optical path to supply the pumping light for the former stage obtained by the four-wave mixed light to the EDF 14. The rest of the configuration is similar to that in FIG. 6.

FIG. 13 shows an example of the four-wave mixed light in FIG. 12.

Item (a) in FIG. 13 shows the pumping lights $\lambda_1'$ and $\lambda_2'$ in FIG. 12 by way of example. Here, $\lambda_1'$ is 1420 nm and $\lambda_2'$ is 1450 nm (see Item (a) in FIG. 7). Therefore, $\Delta\lambda=|\lambda_1'-\lambda_2'|=30$ nm.

Item (b) in FIG. 13 shows the four-wave mixed light obtained by mixing them. At both ends of the pumping lights $\lambda_1'$ and $\lambda_2'$, two optical signals $\lambda_0'(=\lambda_1'-\Delta\lambda)$ and $\lambda_3'(=\lambda_2'+\Delta\lambda)$ are newly generated as a result of the mixing. Among them, $\lambda_3'=\lambda_2'+\Delta\lambda=1450$ nm+30 nm=1480 nm is used as the pumping light for the former-stage EDF 14 in this example (see FIG. 2). This pumping light is supplied to the EDF 14 in the former stage via the optical couplers 66 and 67.

Figure 14:
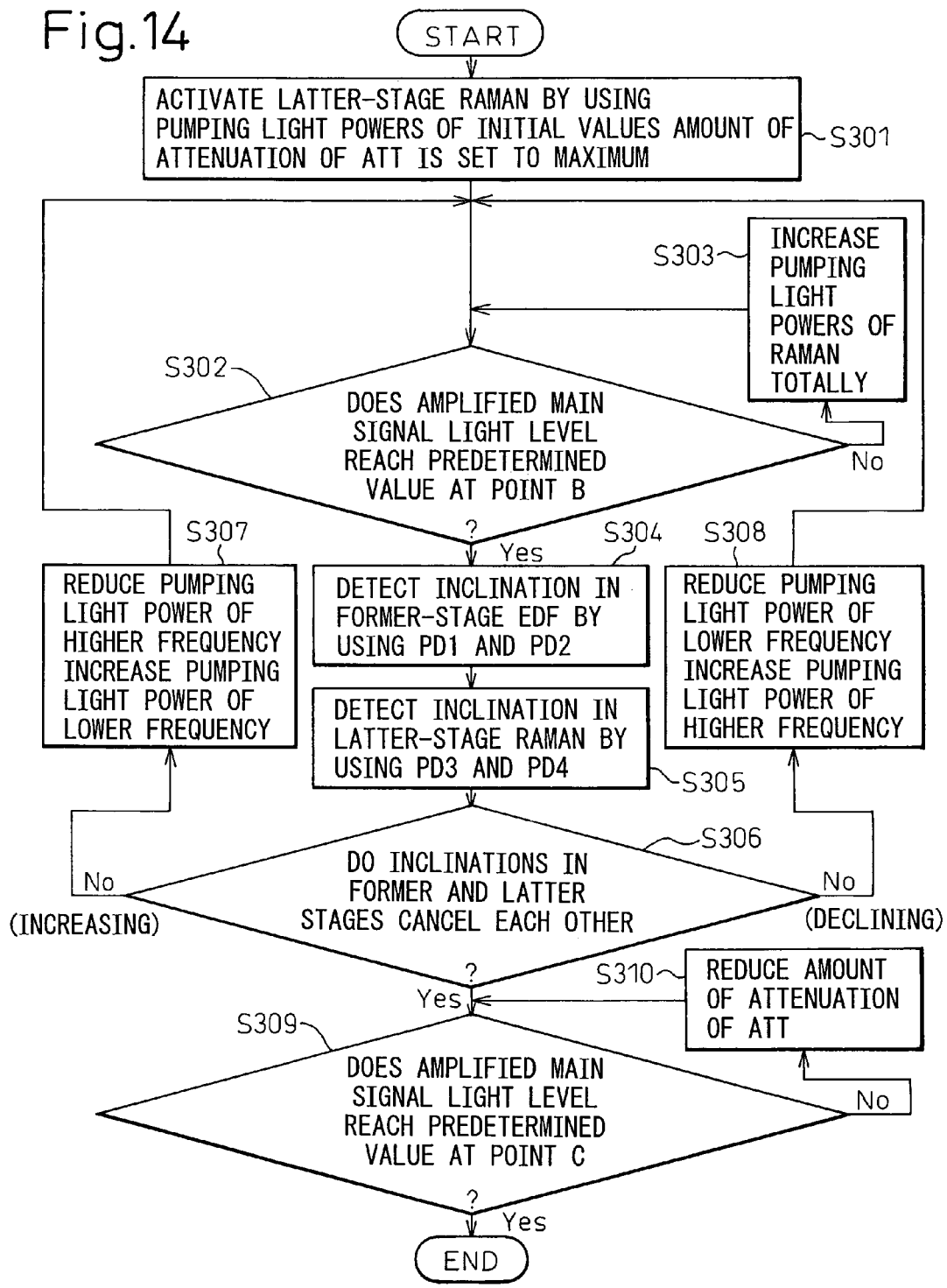
FIG. 14 is a diagram showing an exemplary control flow of tilt compensation in FIG. 12.

FIG. 14 shows an exemplary control flow of tilt compensation in FIG. 12.

In FIG. 14, the feedback control section 33 first activates the latter-stage Raman fiber 61 by using the pumping light powers of respective initial values. At this time, the amount of attenuation of the optical variable attenuator 21 is set to a maximum value (S301). At the same time, the former-stage EDF 14 is also activated by the pumping light $\lambda_3'$ for the former stage that is generated accordingly.

Next, at point B (FIG. 12) where the amplified main signal is output from the former-stage EDF 14, it is determined whether the level of the main signal reaches a predetermined value or not (S302). If it does not reach said predetermined value, the Raman fiber pumping sections 63 and 64 are controlled to increase the total power of the pumping lights ($\lambda_1'$ and $\lambda_2'$) until the level of the main signal reaches said predetermined value (S303).

If the level of the main signal reaches said predetermined value, the inclination of the level of the main signal (the amount of tilt) in the former-stage EDF 14 is detected from the difference of the level between the probe lights $P\lambda_1$ and $P\lambda_2$ for the former stage (S304) and, at the same time, the inclination of the level of the main signal (the amount of tilt) in the latter-stage Raman fiber 61 is also detected from the difference of the level between the probe lights $P\lambda_1$ and $P\lambda_2$ for the latter stage (S305).

Next, it is determined whether the inclinations in the former-stage EDF 14 and the latter-stage Raman fiber 61 cancel each other to achieve a flat gain or not (S306). Based on the result of this determination, if the inclination obtained by combining the two inclinations is steadily increasing (Item (a) in FIG. 7), the Raman fiber pumping sections 63 and 64 are controlled to reduce the power of the pumping light of a higher frequency and, at the same time, increase the power of the pumping light of a lower frequency till the increasing inclination of the tilt characteristics is eliminated and a flat gain is achieved (S307).

On the contrary, if the inclination obtained by combining the two inclinations is steadily declining (Item (b) in FIG. 7), the power of the pumping light of a lower frequency is reduced and, at the same time, the power of the pumping light of a higher frequency is increased till the declining inclination of the tilt characteristics is eliminated and a flat gain is achieved (S308).

After the flat gain is achieved, at point C (FIG. 12) where the main signal is output from the latter-stage Raman fiber 61, in order to keep the optical output of the main signal constant, it is determined whether the level of the main signal reaches a predetermined value or not (S309). If it does not reach said predetermined value, the optical variable attenuator 21 is controlled to reduce the amount of attenuation till the level of the main signal reaches said predetermined value (S310) so that the output level of the main signal is kept constant.

Figure 15:
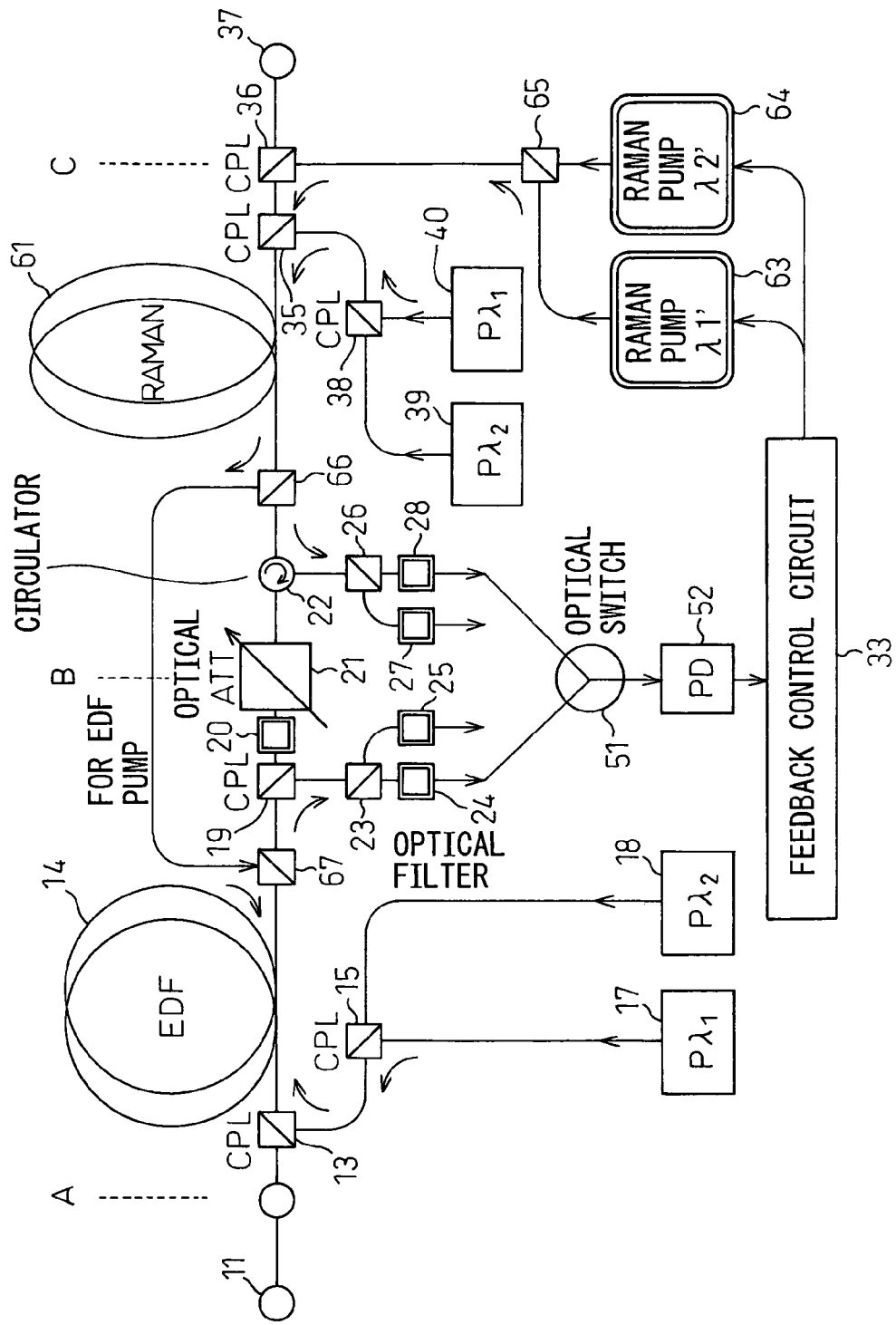
FIG. 15 is a diagram showing another exemplary aspect (1) of FIG. 12.

FIG. 15 shows another exemplary aspect of the third embodiment shown in FIG. 12.

In a similar manner to that in FIG. 5 described above, the multistage optical amplifier in this example uses one optical switch 51 and one photodiode 52 so that the common photodiode 52 can detect each probe light $P\lambda_1$ and $P\lambda_2$ by sequentially switching the optical switch 51. Other configuration is similar to that in FIG. 12.

According to this configuration, the common control section in FIG. 12 can be configured simply and the feedback control section 33 can compare the respective probe lights $P\lambda_1$ and $P\lambda_2$ accurately without adjustment.

Figure 16:
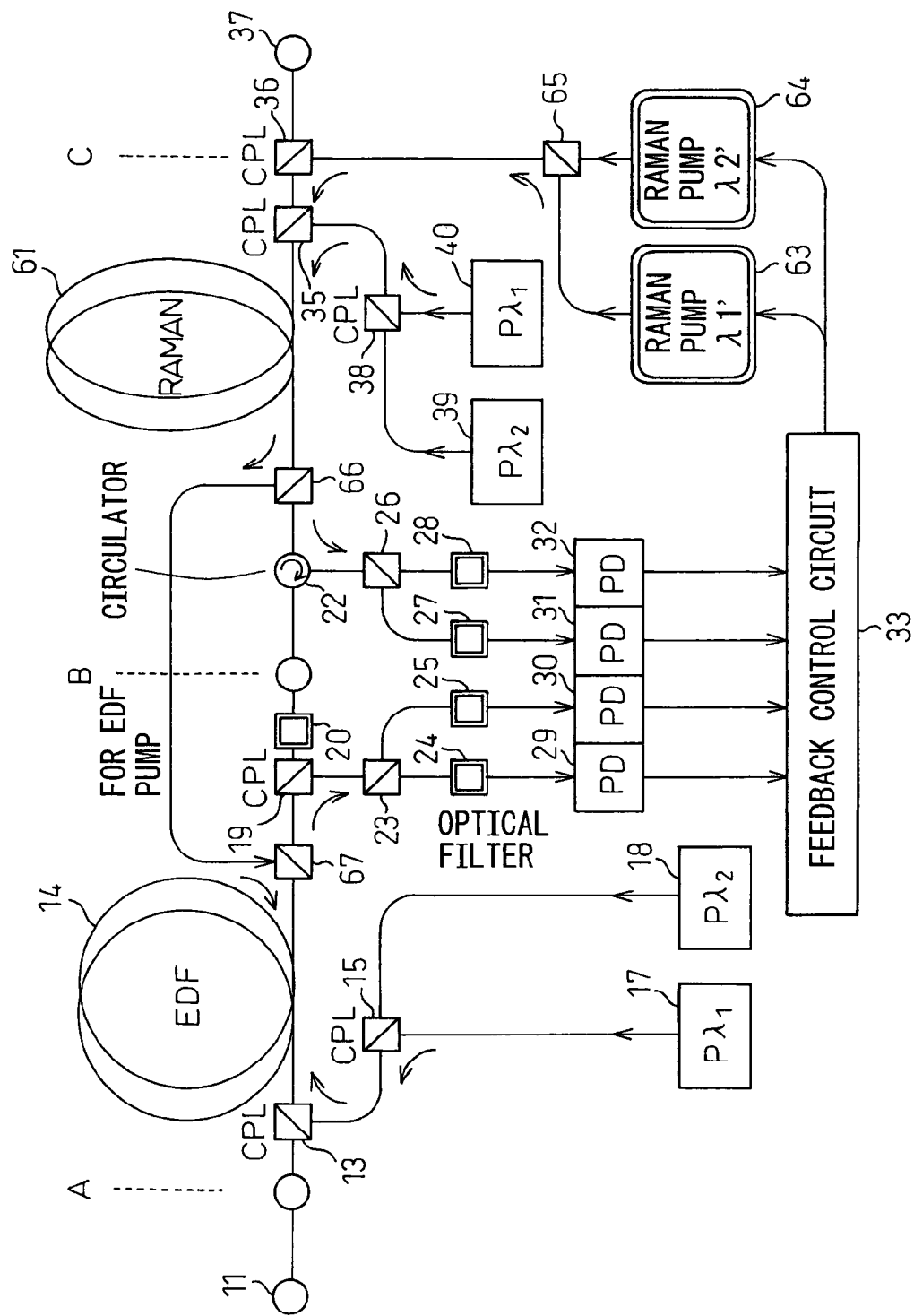
FIG. 16 is a diagram showing another exemplary aspect (2) of FIG. 12.

FIG. 16 shows yet another exemplary aspect of the third embodiment shown in FIG. 12.

The multistage optical amplifier in FIG. 16 is configured similarly to that in FIG. 12 except that the optical variable attenuator (ATT) 21 in FIG. 12 is omitted. In this example, the Raman fiber 61 and the Raman fiber pumping sections 63 and 64, which are controlled by the feedback control section 33, act in place of the optical variable attenuator (ATT) 21.

Figure 17:
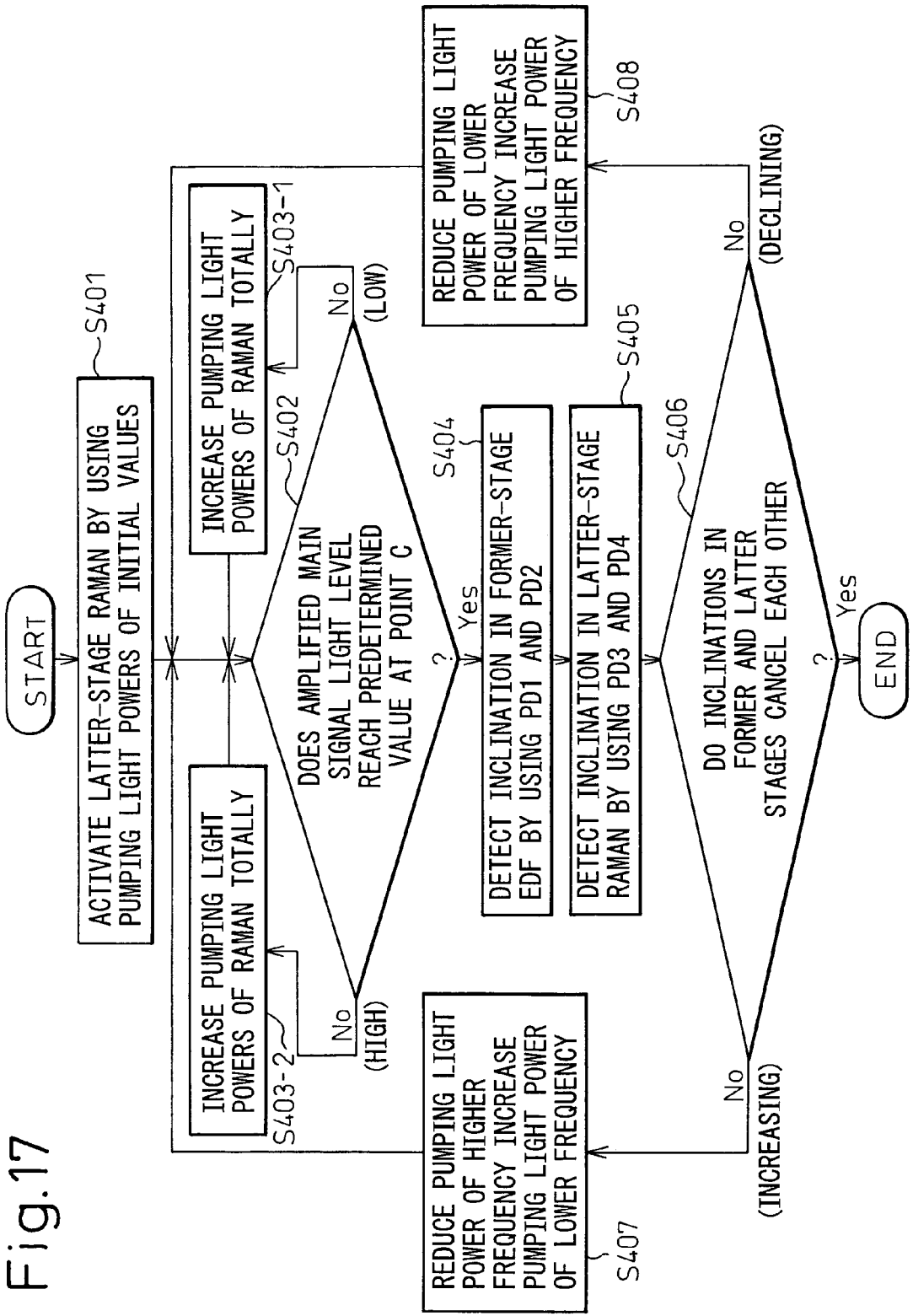
FIG. 17 is a diagram showing an exemplary control flow of tilt compensation in FIG. 16.

FIG. 17 shows an exemplary control flow of tilt compensation in FIG. 16.

As for FIG. 17, only the difference from the control flow of tilt compensation shown in FIG. 14 will be described. First, in step S401, the setting of the optical variable attenuator 21 is not included, naturally. Then, in step S402, after a flat gain is achieved in steps S406-S408, the variation of the level at point C generated by the process to achieve the flat gain is corrected.

To that end, in step S402, the Raman fiber pumping sections 63 and 64 are controlled repeatedly to increase or decrease the total power of the pumping lights until the level of the main signal is stabilized at a predetermined constant value (S403-1 and S403-2) so that the optical output of the main signal is kept constant. Other steps are similar to those in the control flow in FIG. 14.

Figure 18:
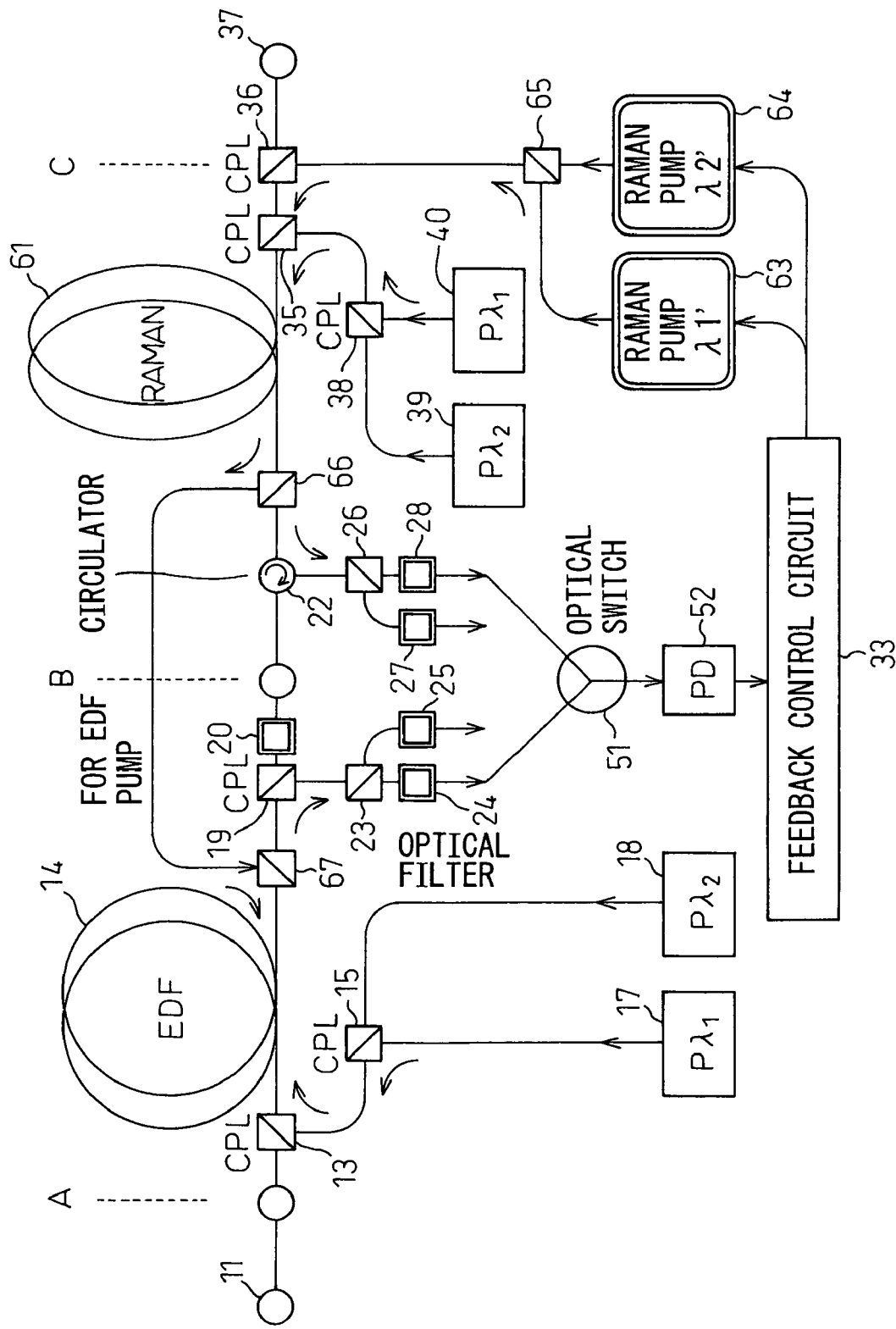
FIG. 18 is a diagram showing another exemplary aspect (3) of FIG. 12.

FIG. 18 shows another exemplary aspect of FIG. 16.

In a similar manner to that in FIG. 5 described above, the multistage optical amplifier in this example uses one optical switch 51 and one photodiode 52 so that the common photodiode 52 can detect each probe light $P\lambda_1$ and $P\lambda_2$ by sequentially switching the optical switch 51. The rest of the configuration is similar to that in FIG. 16.

According to this configuration, the configuration of the common control section in FIG. 12 can be configured very simply and the feedback control section 33 can compare the respective probe lights $P\lambda_1$ and $P\lambda_2$ accurately without adjustment.

The invention claimed is:

1. A multistage optical amplifier comprising:
   a plurality of optical amplifiers in a multistage connection, wherein a first pumping light of a former-stage optical amplifier is incident from a direction of an input signal and a second pumping light of a latter-stage optical amplifier is incident from a reverse direction of the input signal;
   probe light sources inputting probe lights disposed at both ends of a wavelength range of a main signal to each of said plurality of optical amplifiers, wherein probe lights of the former-stage optical amplifier are incident from a direction of an input signal and probe lights of the latter-stage optical amplifier are incident from a reverse direction of the input signal; and
   a common control section commonly controlling pumping light powers of said plurality of optical amplifiers, wherein said common control section includes:
      tilt detection means for detecting amounts of tilt of each of said plurality of optical amplifiers; and
      tilt cancellation means for controlling the pumping light powers of said plurality of optical amplifiers so that the amounts of tilt of each of the optical amplifiers detected by said tilt detection means cancel each other, wherein
      said tilt detection means detects the amounts of tilt of each of said optical amplifiers from the difference of output level between said probe lights disposed at both ends of a wavelength range of a main signal, and
      said tilt cancellation means achieves flat gain-wavelength characteristics of the multistage optical amplifier by canceling the amounts of tilt of each of said optical amplifiers.

2. A multistage optical amplifier according to claim 1, wherein said multistage amplifier is constituted as a two-stage optical amplifier in which each of a former stage and a latter stage comprise an erbium doped fiber, and
   said tilt cancellation means increases or decreases pumping light powers of the erbium doped fibers in said former-stage and latter-stage optical amplifiers independently so that the amounts of tilt cancel each other.

3. A multistage optical amplifier according to claim 2, further having a variable optical attenuator adjusting an optical output level between said former-stage optical amplifier and said latter-stage optical amplifier.

4. A multistage optical amplifier according to claim 1, wherein said multistage amplifier is constituted as a two-stage optical amplifier in which a former stage comprises an optical amplifier having an erbium doped fiber and a latter stage comprises an optical amplifier having a Raman fiber, and
   said tilt cancellation means increases or decreases pumping light power of the erbium doped fiber in said former-stage optical amplifier and, then, increases or decreases a total power of the first and second pumping lights at different wavelengths of the Raman fiber in said latter-stage optical amplifier or a partial power thereof, so that the amounts of tilt of the former-stage and the latter-stage optical amplifiers cancel each other.

5. A multistage optical amplifier according to claim 4, further having a variable optical attenuator controlling an optical output level between said former-stage optical amplifier and said latter-stage optical amplifier.

6. A multistage optical amplifier according to claim 5, wherein, in place of said variable optical attenuator, the optical output level is controlled by increasing or decreasing a total power of the first and second pumping lights at different wavelengths of the Raman fiber in said latter-stage optical amplifier.

7. A multistage optical amplifier comprising:
   a plurality of optical amplifiers in a multistage connection, wherein a first pumping light of a former-stage optical amplifier having an erbium doped fiber is incident from a direction of an input signal and a second pumping light of a latter-stage optical amplifier having a Raman fiber is incident from a reverse direction of the input signal;
   probe light sources inputting probe lights disposed at both ends of a wavelength range of a main signal to each of said plurality of optical amplifiers; and
   a common control section commonly controlling pumping light powers of said plurality of optical amplifiers, wherein said common control section includes:
      tilt detection means for detecting amounts of tilt of each of said plurality of optical amplifiers; and
      tilt cancellation means for controlling the pumping light powers of said plurality of optical amplifiers so that the amounts of tilt of each of the optical amplifiers detected by said tilt detection means cancel each other, wherein
      said tilt detection means detects the amounts of tilt of each of said optical amplifiers from the difference of output level between said probe lights disposed at both ends of a wavelength range of a main signal,
      said tilt cancellation means achieves flat gain-wavelength characteristics of the multistage optical amplifier by canceling the amounts of tilt of each of said optical amplifiers, wherein said tilt cancellation means increases or decreases pumping light power of the erbium doped fiber in said former-stage optical amplifier and, then, increases or decreases a total power of the first and second pumping lights at different wavelengths of the Raman fiber in said latter-stage optical amplifier or a partial power thereof, so that the amounts of tilt of the former-stage and the latter-stage optical amplifiers cancel each other, and
      said pumping light power of the erbium doped fiber is generated as a four-wave mixed light of said plurality of pumping lights of the Raman fiber.

8. A method for controlling tilt of a multistage optical amplifier in which two stages of optical amplifiers are interconnected, comprising;

activating a former-stage optical amplifier and a latter-stage optical amplifier by respective pumping light powers, wherein a first pumping light of the former-stage optical amplifier is incident from a direction of an input signal and a second pumping light of the latter-stage optical amplifier is incident from a reverse direction of the input signal;

inputting probe lights disposed at both ends of a wavelength range of a main signal to each of said optical amplifiers, wherein probe lights of the former-stage optical amplifier are incident from a direction of an input signal and probe lights of the latter-stage optical amplifier are incident from a reverse direction of the input signal;

controlling the pumping light power of the former-stage optical amplifier so that the optical output of the former-stage optical amplifier reaches a desired level;

detecting amounts of tilt of each of the former-stage optical amplifier and the latter-stage optical amplifier; and controlling the pumping light power of the latter-stage optical amplifier so that the amount of tilt of the former-stage optical amplifier is canceled by the amount of tilt of the latter-stage optical amplifier and, as a result, the combined amount of tilt of the former-stage optical amplifier and the latter-stage optical amplifier falls within a desired range, wherein said detecting detects the amounts of tilt of each of said optical amplifiers from the difference of output level between said probe lights disposed at both ends of a wavelength range of a main signal, and said controlling the pumping light power of the latter-stage optical amplifier achieves flat gain-wavelength characteristics of the multistage optical amplifier by canceling the amounts of tilt of each of said optical amplifiers.

9. A multistage optical amplifier comprising:

a plurality of optical amplifiers in a multistage connection, wherein a first pumping light of a former-stage optical amplifier having an erbium doped fiber is incident from a direction of an input signal and a second pumping light of a latter-stage optical amplifier having a Raman fiber is incident from a reverse direction of the input signal;

a variable optical attenuator controlling an optical output level between said former-stage optical amplifier and said latter-stage optical amplifier;

probe light sources inputting probe lights disposed at both ends of a wavelength range of a main signal to each of said plurality of optical amplifiers; and a common control section commonly controlling pumping light powers of said plurality of optical amplifiers, wherein said common control section includes:

tilt detection means for detecting amounts of tilt of each of said plurality of optical amplifiers; and tilt cancellation means for controlling the pumping light powers of said plurality of optical amplifiers so that the amounts of tilt of each of the optical amplifiers detected by said tilt detection means cancel each other, wherein said tilt detection means detects the amounts of tilt of each of said optical amplifiers from the difference of output level between said probe lights disposed at both ends of a wavelength range of a main signal, said tilt cancellation means achieves flat gain-wavelength characteristics of the multistage optical amplifier by canceling the amounts of tilt of each of said optical amplifiers, wherein said tilt cancellation means increases or decreases pumping light power of the erbium doped fiber in said former-stage optical amplifier and, then, increases or decreases a total power of the first and second pumping lights at different wavelengths of the Raman fiber in said latter-stage optical amplifier or a partial power thereof, so that the amounts of tilt of the former-stage and the latter-stage optical amplifiers cancel each other, and said pumping light power of the erbium doped fiber is generated as a four-wave mixed light of said plurality of pumping lights of the Raman fiber.

10. A multistage optical amplifier comprising:

a plurality of optical amplifiers in a multistage connection, wherein a first pumping light of a former-stage optical amplifier having an erbium doped fiber is incident from a direction of an input signal and a second pumping light of a latter-stage optical amplifier having a Raman fiber is incident from a reverse direction of the input signal, and the optical output level is controlled by increasing or decreasing a total power of the first and second pumping lights at different wavelengths of the Raman fiber in said latter-stage optical amplifier;

probe light sources inputting probe lights disposed at both ends of a wavelength range of a main signal to each of said plurality of optical amplifiers; and a common control section commonly controlling pumping light powers of said plurality of optical amplifiers, wherein said common control section includes:

tilt detection means for detecting amounts of tilt of each of said plurality of optical amplifiers; and tilt cancellation means for controlling the pumping light powers of said plurality of optical amplifiers so that the amounts of tilt of each of the optical amplifiers detected by said tilt detection means cancel each other, wherein said tilt detection means detects the amounts of tilt of each of said optical amplifiers from the difference of output level between said probe lights disposed at both ends of a wavelength range of a main signal, said tilt cancellation means achieves flat gain-wavelength characteristics of the multistage optical amplifier by canceling the amounts of tilt of each of said optical amplifiers, wherein said tilt cancellation means increases or decreases pumping light power of the erbium doped fiber in said former-stage optical amplifier and, then, increases or decreases a total power of the first and second pumping lights at different wavelengths of the Raman fiber in said latter-stage optical amplifier or a partial power thereof, so that the amounts of tilt of the former-stage and the latter-stage optical amplifiers cancel each other, and said pumping light power of the erbium doped fiber is generated as a four-wave mixed light of said plurality of pumping lights of the Raman fiber.

11. A multistage optical amplifier, comprising:

a plurality of optical amplifiers in a multistage connection; and a common control section commonly controlling pumping light powers of said plurality of optical amplifiers, wherein said common control section includes:

tilt detection means for detecting amounts of tilt of each of said plurality of optical amplifiers, and detecting the amounts of tilt of each of said optical amplifiers from the difference of the level between probe lights disposed at both ends of a wavelength range of a main signal, said tilt detection means including common light detection means for commonly detecting probe lights from said plurality of optical amplifiers, and switch means for sequentially switching the probe lights from said plurality of optical amplifiers and supplying the probe lights to said common light detection means; and tilt cancellation means for controlling the pumping light powers of said plurality of optical amplifiers so that the amounts of tilt of each of the optical amplifiers detected by said tilt detection means cancel each other, and achieving flat gain-wavelength characteristics of the multistage optical amplifier by canceling the amounts of tilt of each of said optical amplifiers.

12. An apparatus, comprising:

a plurality of optical amplifiers in a multistage connection; and a common control section commonly controlling pumping light powers of said plurality of optical amplifiers, wherein said common control section includes:
- a tilt detection unit detecting amounts of tilt of each of said plurality of optical amplifiers, and detecting the amounts of tilt of each of said optical amplifiers from the difference of the level between probe lights disposed at both ends of a wavelength range of a main signal, said tilt detection unit including a common light detection unit commonly detecting probe lights from said plurality of optical amplifiers, and a switch unit sequentially switching the probe lights from said plurality of optical amplifiers and supplying the probe lights to said common light detection unit; and
- a tilt cancellation unit controlling the pumping light powers of said plurality of optical amplifiers so that the amounts of tilt of each of the optical amplifiers detected by said tilt detection unit cancel each other, and achieving flat gain-wavelength characteristics of the multistage optical amplifier by canceling the amounts of tilt of each of said optical amplifiers.

13. A multistage optical amplifier comprising:

a plurality of optical amplifiers in a multistage connection, a first pumping light of a former-stage optical amplifier being incident from a direction of an input signal and a second pumping light of a latter-stage optical amplifier being incident from a reverse direction of the input signal;

probe light sources inputting probe lights disposed at both ends of a wavelength range of a main signal to each of said plurality of optical amplifiers, at least two probe lights of the former-stage optical amplifier being incident from a direction of an input signal and at least another two probe lights of the latter-stage optical amplifier being incident from a reverse direction of the input signal; and a circulator isolating from the former-stage optical amplifier the second pumping light and the at least another two probe lights.

* * * * *

UNITED STATES PATENT AND TRADEMARK OFFICE
CERTIFICATE OF CORRECTION

PATENT NO.        : 7,391,560 B2                                              Page 1 of 1
APPLICATION NO.   : 10/945272
DATED             : June 24, 2008
INVENTOR(S)       : Hidezumi Natori et al.

It is certified that error appears in the above-identified patent and that said Letters Patent is hereby corrected as shown below:

Column 12, Line 67, change "comprising;" to --comprising:--.

Signed and Sealed this

Thirtieth Day of September, 2008

JON W. DUDAS
*Director of the United States Patent and Trademark Office*